US012271580B2

(12) United States Patent
You et al.

(10) Patent No.: US 12,271,580 B2
(45) Date of Patent: Apr. 8, 2025

(54) ELECTRONIC DEVICE SUPPORTING MULTI-WINDOW MODE AND CONTROL METHOD THEREOF

(71) Applicant: Samsung Electronics Co., Ltd., Suwon-si (KR)

(72) Inventors: Cheonkum You, Suwon-si (KR); Jinseong Park, Suwon-si (KR); Bongseop Song, Suwon-si (KR); Taebong Ha, Suwon-si (KR); Sangheon Kim, Suwon-si (KR); Jinwan An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/153,719

(22) Filed: Jan. 12, 2023

(65) Prior Publication Data

US 2023/0146478 A1 May 11, 2023

Related U.S. Application Data

(63) Continuation of application No. PCT/KR2021/010287, filed on Aug. 4, 2021.

(30) Foreign Application Priority Data

Aug. 4, 2020 (KR) .................. 10-2020-0097381

(51) Int. Cl.
*G06F 3/04842* (2022.01)
*G06F 3/0486* (2013.01)

(52) U.S. Cl.
CPC ........ *G06F 3/04842* (2013.01); *G06F 3/0486* (2013.01); *G06F 2203/04803* (2013.01)

(58) Field of Classification Search
CPC .................. G06F 3/048; G06F 3/0486; G06F 3/0481–0483; G06F 3/04842; G06F 3/0488–04886
See application file for complete search history.

(56) References Cited

U.S. PATENT DOCUMENTS 7,913,183 B2 * 3/2011 Czerwinski ........... G06F 3/0481
715/779
9,152,180 B2 10/2015 Kim
(Continued)

FOREIGN PATENT DOCUMENTS

CN 104793875 A 7/2015
CN 106126009 A 11/2016
(Continued)

OTHER PUBLICATIONS

International Search Report dated Nov. 22, 2021, issued in International Application No. PCT/KR2021/010287.
(Continued)

*Primary Examiner* — Liang Y Li
(74) *Attorney, Agent, or Firm* — Jefferson IP Law, LLP

(57) ABSTRACT

An electronic device is provided. The electronic device includes a sensor, a display, a processor, and a memory including instructions which, when executed, cause the processor to acquire display feature information based on a state of the electronic device, receive a first user input which selects a first icon displayed in a first area of the display for executing an application, determine a multi-window layout for displaying an execution screen of multiple applications in response to the first user input, based on the display feature information, display the determined multi-window layout in a second area of the display, display a second icon to which an operation of storing the displayed multi-window layout is mapped, upon receiving a second user input of selecting the second icon, store the multi-window layout,
(Continued)

and generate a third icon to which the multi-window layout is mapped, and display the third icon in the first area.

19 Claims, 20 Drawing Sheets

(56) References Cited

U.S. PATENT DOCUMENTS

| | | | |
|---|---|---|---|
| 10,353,540 B2 | 7/2019 | Hiranuma et al. | |
| 10,452,156 B2 | 10/2019 | Kang et al. | |
| 11,250,815 B2 | 2/2022 | Lee et al. | |
| 11,256,389 B2 | 2/2022 | Shin et al. | |
| 11,262,800 B2 | 3/2022 | Kim et al. | |
| 2006/0224991 A1* | 10/2006 | Stabb | G06F 9/451 |
| | | | 715/781 |
| 2010/0313154 A1* | 12/2010 | Choi | G06F 9/451 |
| | | | 715/765 |
| 2013/0135178 A1 | 5/2013 | Miyahara | |
| 2014/0047379 A1* | 2/2014 | Urawaki | G06F 3/1423 |
| | | | 715/789 |
| 2014/0164957 A1* | 6/2014 | Shin | H04L 65/403 |
| | | | 715/806 |
| 2014/0325428 A1 | 10/2014 | Lee et al. | |
| 2014/0325431 A1* | 10/2014 | Vranjes | G06F 3/04847 |
| | | | 715/788 |
| 2014/0380201 A1* | 12/2014 | Massand | G06F 3/0481 |
| | | | 715/761 |
| 2017/0220307 A1* | 8/2017 | Da Silva Ramos | G06F 3/1438 |
| 2017/0315708 A1* | 11/2017 | Judd | G06F 3/0482 |
| 2017/0322709 A1 | 11/2017 | Chen et al. | |
| 2019/0065031 A1* | 2/2019 | Kang | G06F 3/04817 |
| 2021/0157480 A1 | 5/2021 | Morita et al. | |

FOREIGN PATENT DOCUMENTS

| | | | | |
|---|---|---|---|---|
| CN | 110727382 A | | 1/2020 | |
| JP | 2012-069060 A | | 4/2012 | |
| KR | 10-2014-0128724 A | | 11/2014 | |
| KR | 20170086807 A | * | 1/2016 | G06F 9/44 |
| KR | 10-1770626 B1 | | 9/2017 | |
| KR | 10-2019-0021142 A | | 3/2019 | |
| KR | 10-2019-0031870 A | | 3/2019 | |
| KR | 10-2020-0008804 A | | 1/2020 | |
| KR | 10-2183071 B1 | | 11/2020 | |
| WO | 2020/009047 A1 | | 1/2020 | |

OTHER PUBLICATIONS

Korean Office Action dated Feb. 5, 2025, issued in Korean Application No. 10-2020-0097381.

* cited by examiner

ELECTRONIC DEVICE SUPPORTING MULTI-WINDOW MODE AND CONTROL METHOD THEREOF

CROSS-REFERENCE TO RELATED APPLICATION(S)

This application is a continuation application, claiming priority under § 365(c), of an International application No. PCT/KR2021/010287, filed on Aug. 4, 2021, which is based on and claims the benefit of a Korean patent application number 10-2020-0097381, filed on Aug. 4, 2020, in the Korean Intellectual Property Office, the disclosure of which is incorporated by reference herein in its entirety.

BACKGROUND

1. Field

The disclosure relates to an electronic device supporting a multi-window mode and a control method thereof.

2. Description of Related Art

An electronic device may support a multi-window mode for displaying execution screens of a plurality of applications on one screen of its display. For example, the electronic device may split one screen into N and may display execution screens of N applications at the same time.

The electronic device may determine arrangement of the execution screens of the applications in the multi-window mode depending on frequencies of use of the applications. For example, the electronic device may display an execution screen of an application with the highest frequency of use on the largest area among the split screen areas and may display an application with a relatively low frequency of use on a relatively small area in the split screen.

The above information is presented as background information only to assist with an understanding of the disclosure. No determination has been made, and no assertion is made, as to whether any of the above might be applicable as prior art with regard to the disclosure.

SUMMARY

There is an issue in which an electronic device of the related art may map only a specified layout when generating an icon to which the arrangement (multi-window layout) of execution screens of a plurality of applications to be run in a multi-window mode is mapped and in which a user is unable to configure a layout to be mapped.

Furthermore, there is an issue in which the electronic device of the related art may not provide an icon in which a multi-window layout to which the plurality of applications configured by the user are mapped is intuitively reflected.

Furthermore, as a display of an electronic device is able to dynamically change in size like a foldable electronic device or a rollable electronic device, the electronic device needs to provide an optimized multi-window layout in response to a variable display.

Aspects of the disclosure are to address at least the above-mentioned problems and/or disadvantages and to provide at least the advantages described below. Accordingly, an aspect of the disclosure is to provide an electronic device supporting a multi-window mode and a control method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a sensor, a display, at least one processor, and a memory operatively connected with the at least one processor. The memory may store one or more instructions, when executed, causing the at least one processor to obtain display feature information of the display based on a state of the electronic device, which is identified by the sensor, receive a first user input for selecting a first icon for running an application, which is displayed on a first area of a display area of the display, determine a multi-window layout displaying execution screens of a plurality of applications in response to the first user input, based on the display feature information, display the determined multi-window layout on a second area of the display, display a second icon to which an operation of storing the displayed multi-window layout is mapped, and store the displayed multi-window layout, in response to receiving a second user input for selecting the second icon and generate and display a third icon to which the multi-window layout is mapped on the first area.

In accordance with another aspect of the disclosure, a control method of an electronic device supporting a multi-window mode is provided. The control method includes obtaining display feature information of a display of the electronic device based on a state of the electronic device, which is identified by a sensor of the electronic device, receiving a first user input for selecting a first icon for running an application, which is displayed on a first area of a display area of the display, determining a multi-window layout displaying execution screens of a plurality of applications in response to the first user input, based on the display feature information, displaying the determined multi-window layout on a second area of the display area of the display, displaying a second icon to which an operation of storing the displayed multi-window layout is mapped, and storing the displayed multi-window layout, in response to receiving a second user input for selecting the second icon, and generating and displaying a third icon to which the multi-window layout is mapped on the first area.

According to various embodiments disclosed in the disclosure, the electronic device may configure and store a multi-window layout based on the user input and may fetch the stored multi-window layout when the user wants to use the same multi-window layout, thus improving the availability of a multi-window mode.

Furthermore, according to various embodiments disclosed in the disclosure, the electronic device may allow the user to intuitively recognize a multi-window layout mapped to an icon for executing a multi-window mode based on a shape of the corresponding icon.

Furthermore, according to various embodiments disclosed in the disclosure, the electronic device, such as a foldable electronic device or a rollable electronic device, a display of which is able to be changed dynamically, may optimize and display a multi-window layout configured by the user and an icon to which the multi-window layout is mapped in response to the state of the display.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
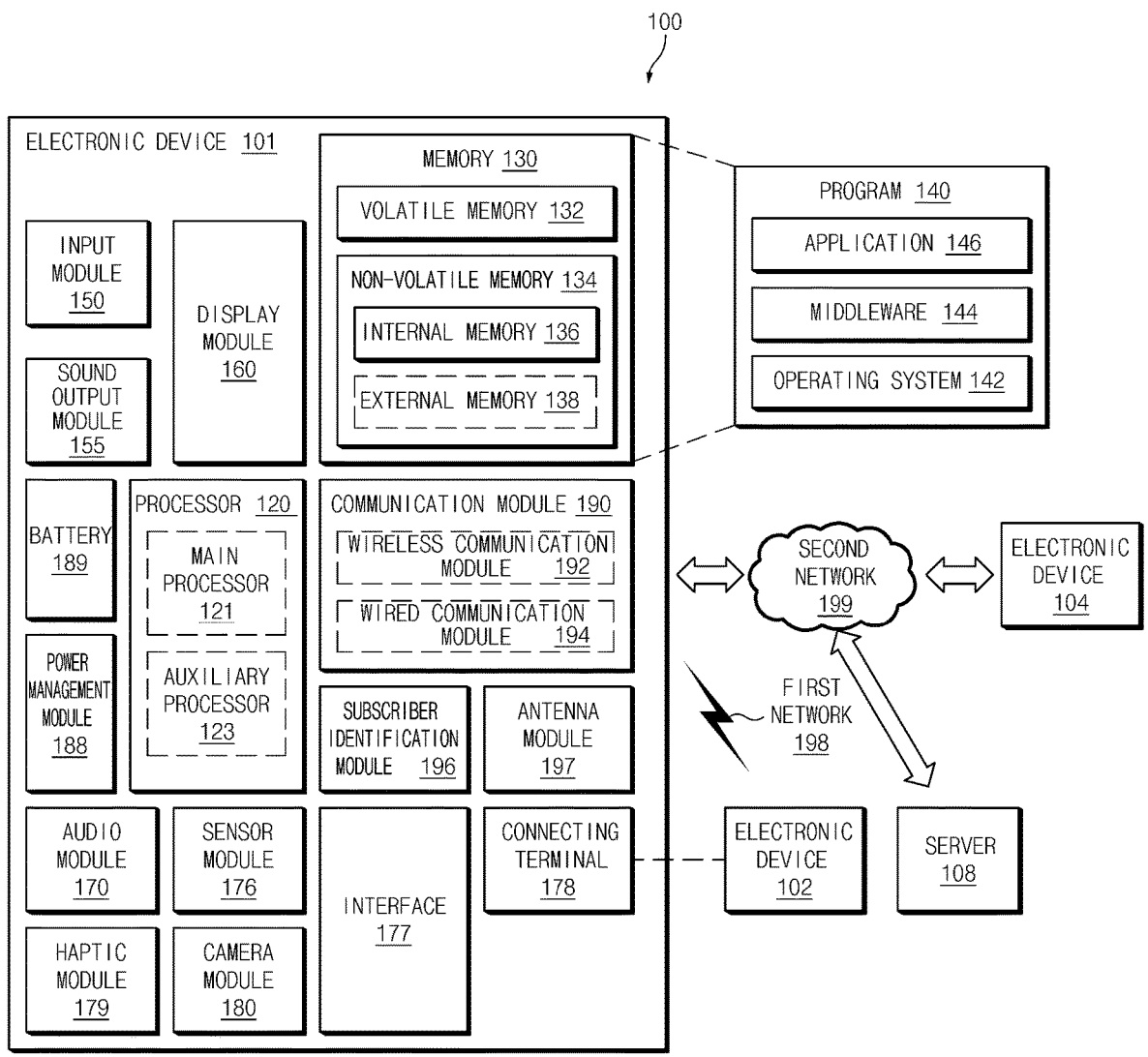
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Hereinafter, a description will be given of a configuration and an operation of an electronic device according to an embodiment with reference to FIG. 2.

Figure 2:
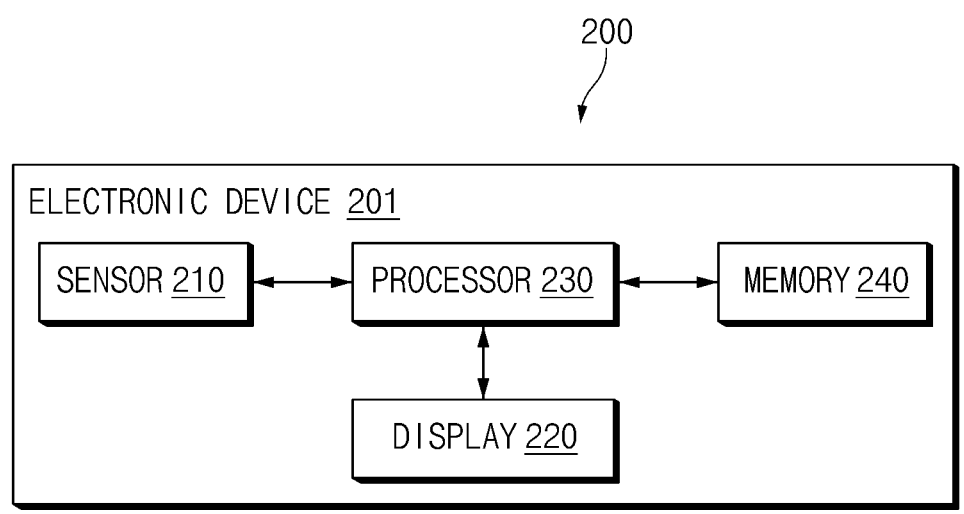
FIG. 2 is a block diagram of an electronic device according to an embodiment of the disclosure.

FIG. 2 is a block diagram 200 of an electronic device according to an embodiment of the disclosure.

Referring to FIG. 2, an electronic device 201 (e.g., an electronic device 101 of FIG. 1) may include a sensor 210 (e.g., a sensor module 176 of FIG. 1), a display 220 (e.g., a display module 160 of FIG. 1), a processor 230 (e.g., a processor 120 of FIG. 1), and a memory 240 (e.g., a memory 130 of FIG. 1).

According to an embodiment of the disclosure, the processor 230 may be operatively connected with the display 220 and the memory 240. According an embodiment of the disclosure, the processor 230 may process information based on a signal detected by the sensor 210 or may control the sensor 210. According an embodiment of the disclosure, the processor 230 may output the processed information on the display 220 or may receive a touch input on the display 220 (e.g., a touch screen display). According an embodiment of the disclosure, the processor 230 may execute one or more instructions stored in the memory 240.

According to an embodiment of the disclosure, the processor 230 may identify a state of the electronic device 201 by means of the sensor 210. For example, the sensor 210 may be at least one of a magnetic sensor, such as a hall sensor, a proximity sensor, an illumination sensor, a touch sensor, a bending sensor, or an infrared sensor or may be a combination thereof.

For example, when the display 220 of the electronic device 201 is a foldable display, the processor 230 may identify a folding state (or a folded state) of the display 220 or a housing moving integrally with the display 220, based on the signal detected by the sensor 210. According an embodiment of the disclosure, the processor 230 may identify whether the display 220 is folded or an angle at which the display 220 is folded. For example, the sensor 210 may be provided in a hinge structure.

As another example, when the display 220 of the electronic device 201 is a rollable display, the processor 230 may identify a rolling state or a sliding state of the display 220. According an embodiment of the disclosure, the processor 230 may identify the rolling state (or the sliding state) of the display 220. According an embodiment of the disclosure, the processor 230 may identify whether to roll in/out (or whether to slide in/out) and a rolling degree (or a sliding degree). For example, a magnetic substance may be provided in a cylindrical structure (e.g., a roll) which is an axis on which the display 220 is wound, and a magnetic sensor may be disposed on the display 220. According an embodiment of the disclosure, because the electronic device 201 stores location information of the magnetic sensor disposed on the display 220, the processor 230 may identify a rolling degree (or a sliding degree) of the display 220 based on the location information of the sensor 210 which detects the signal.

According to an embodiment of the disclosure, the processor 230 may obtain display feature information of the display 220 based on the state of the electronic device 201, which is identified by the sensor 210. According to an embodiment of the disclosure, the display feature information may include the enabled display or resolution, a size, an aspect ratio, or the like of the enabled display, which is determined based on the state of the electronic device 201 by the processor 230. For example, for an electronic device, including a first display and a second display arranged to face in opposite directions, in which the second display is a foldable display, the second display may be enabled or the first display may be enabled, according to a folding state of the second display. For example, the processor 230 may obtain resolution, a size, or aspect ratio information of the second display as the second display is enabled and may obtain at least one of resolution, a size, or aspect ratio information of the first display as the first display is enabled.

According to an embodiment of the disclosure, the enabled display may refer to, for example, a screen where content is displayed, that is, a display area of the display 220. For example, for an electronic device including a rollable display, a display area of the display may be expanded or reduced according to a rolling state of the display. For example, the processor 230 may obtain at least one of resolution, a size, or aspect ratio information of the display area of the display depending on the rolling state of the display.

According to an embodiment of the disclosure, the processor 230 may obtain at least one of location information, size information, or resolution information of the display area of the foldable display or the rollable display based on the folding state or the rolling state of the display 220.

According to an embodiment of the disclosure, the display area of the display 220 may include a first area and a second area. According to an embodiment of the disclosure, the first area may refer to an area corresponding to at least one edge of the display 220. The first area may refer to, for example, an area displayed adjacent to at least one edge of the display 220, which may be referred to as an edge panel area. According to an embodiment of the disclosure, the second area may refer to a main area where content is displayed in the display area of the display 220. According to an embodiment of the disclosure, the first area may be at least a portion of the second area.

According to an embodiment of the disclosure, the processor 230 may display the first area only when receiving a specified user input. For example, as the touch panel of the display 220 detects a flick gesture for quickly scrolling towards an inner space surrounded by a plurality of edges of the display 220 from at least one edge of the display 220, the processor 230 may display the first area. For example, the processor 230 may display an edge handler for displaying an area receiving a touch input to display the first area on an area adjacent to the edge in the display area of the display 220 and may display the first area in response to a user input from dragging the edge handler in a direction of being away from the edge.

According to an embodiment of the disclosure, the first area may include one or more first icons for running an application. For example, an application mapped to the first icon may be an application supporting a multi-window mode. The multi-window mode may refer to a function for displaying execution screens of a plurality of applications on one screen at the same time.

According to an embodiment of the disclosure, the processor 230 may receive a first user input for selecting the first icon in the first area. The first user input may include, for example, a tap, double tap, press, swipe, or drag and drop gesture. According to an embodiment of the disclosure, the processor 230 may display an execution screen of an application to which the first icon is mapped on the second area in response to the first user input. According an embodiment of the disclosure, depending on receiving the first user input for selecting the first icon a plurality of times, the processor 230 may run the plurality of applications in the multi-window mode. For example, depending on receiving a user input for dragging and dropping the first icon for running a first application to the second area and receiving a user input for dragging and dropping the first icon for running a second application to the second area, the processor 230 may run the first application and the second application in a two-split mode.

According an embodiment of the disclosure, the processor 230 may determine a multi-window layout of the plurality of applications based on locations where the plurality of first user inputs are detected on the second area. According to an embodiment of the disclosure, the multi-window layout may refer to a form or a structure where the processor 230 splits the display area and arranges execution screens of the plurality of applications on the display areas. The processor 230 may determine the number of divided display areas (e.g., N splits) depending on, for example, the number (e.g., N) of applications which are running and may arrange N multi-windows based on locations where the first user input for selecting the first icon to which each application is mapped is detected. For example, depending on receiving the first user input for running the first application and the first user input for running the second application, the processor 230 may determine to display an execution screen of the first application and an execution screen of the second application in two splits and may arrange a first window to which the execution screen of the first application is mapped and a second window to which the execution screen of the second application is mapped from side to side or up and down, based on a location where the first user for running the first application is detected and a location where the first user input for running the second application is detected. Alternatively, the processor 230 may arrange the first window and the second window in a structure of a full screen and a pop-up screen.

According to an embodiment of the disclosure, the processor 230 may determine a multi-window layout based on the above-mentioned display feature information. According an embodiment of the disclosure, the processor 230 may differently determine arrangement of the multi-window based on at least one of resolution, a size, or an aspect ratio of the display. For example, the processor 230 may determine whether to arrange two multi-windows up and down or from side to side although there is the same two-split mode, depending on the resolution, the size, or the aspect ratio of the display.

The case where the multi-window mode is the two-split mode is described as an example in the above-mentioned embodiment of the disclosure, but a method for determining a multi-window layout in the processor 230 may be applied in the same or similar manner even in various division modes (e.g., three splits or four splits).

According to an embodiment of the disclosure, the processor 230 may display a second icon on the second area where the execution screens of the plurality of applications are displayed depending on the multi-window layout. According an embodiment of the disclosure, as the processor 230 receives the second user input for selecting the second icon, an operation of storing the multi-window layout configured with the execution screens of the plurality of applications in the memory 240 may be mapped to the second icon. According an embodiment of the disclosure, depending on receiving the second user input for selecting the second icon, the processor 230 may store the multi-window layout of the execution screens of the plurality of applications, which is displayed on the second area. The second user input may include, for example, a tap, double tap, press, swipe, or drag and drop gesture.

The case where the processor 230 displays the second icon to store the multi-window layout displayed on the second area and receives the second user input for selecting the second icon is described as an example in the above-mentioned embodiment of the disclosure, but not limited thereto. A description will be given below of a method for determining a multi-window layout to which the plurality of applications are mapped by means of a separate setting screen user interface (UI) for generating an icon to which the multi-window layout is mapped, mapping and storing the determined multi-window layout to the icon, and generating the icon to which the multi-window layout is mapped by means of the setting screen UI of the electronic device with reference to FIG. 11.

According an embodiment of the disclosure, depending on receiving the second user input, the processor 230 may map and store the multi-window layout of the execution screens of the plurality of applications, which is displayed on the second area, to a third icon. According an embodiment of the disclosure, the processor 230 may display the third icon to which the multi-window layout of the execution screens of the plurality of applications, which is displayed on the second area, is mapped. For example, the third icon may include a plurality of first icons corresponding to the plurality of applications, the execution screens of which are displayed on the second area. According an embodiment of the disclosure, the processor 230 may combine the plurality of first icons for respectively running the plurality of applications, the execution screens of which are displayed on the second area, to generate the third icon.

According an embodiment of the disclosure, the processor 230 may determine arrangement of the plurality of first icons based on the multi-window layout configured in the second area to determine a shape of the third icon. According an embodiment of the disclosure, the processor 230 may determine the shape of the third icon by arranging the first icon to corresponding to a location of each of a plurality of windows (e.g., first to Nth windows (where N is a natural number of 2 or more) displayed on the second area.

For example, as the first window is located at a left side of the display area on the multi-window layout and the second window is located at a right side of the display area on the multi-window layout, the processor 230 may generate the third icon where the first icon corresponding to an application mapped to the first window is disposed at the left side and where the first icon corresponding to an application mapped to the second window is disposed at the right side. For another example, as the first window is located at the entire left side of the display area on the multi-window layout, the second window is located on the top at the right side of the display area on the multi-window layout, and the third window is located on the bottom at the right side of the display area on the multi-window layout, the processor 230 may generate the third icon where the first icon corresponding to the application mapped to the first window is disposed at the left side, where the first icon corresponding to the application mapped to the second window is disposed on a right top, and where the first icon corresponding to an application mapped to the third icon is disposed on a right bottom.

According an embodiment of the disclosure, the processor 230 may determine the shape of the third icon by arranging the first icon to corresponding to a structure (e.g., a simple split structure or a pop-up structure) of the plurality of windows (e.g., the first to Nth windows (where N is a natural number of 2 or more) displayed on the second area.

For example, as the first window is located on one area of the display area on the multi-window layout and the second window is located on another area of the display area on the multi-window layout, the processor 230 may arrange the first icon corresponding to the application mapped to the first window and the first icon corresponding to the application mapped to the second window at the same size to generate the third icon. For another example, as the first window is located on at least a portion of the display area on the multi-window layout and the second window is located in the form of pop-up to overlap the first window on the multi-window layout, the processor 230 may overlap the first icon corresponding to the application mapped to the second window with the first icon corresponding to the application mapped to the first window to generate the third icon and may generate the third icon in a form where the first icon corresponding to the application mapped to the first window is larger than the first icon corresponding to the application mapped to the second window.

According to an embodiment of the disclosure, the processor 230 may display the third icon generated as described above on the first area (the edge panel area). According to an embodiment of the disclosure, depending on receiving a user input for selecting the third icon displayed on the first area, the processor 230 may configure the multi-window layout configured with the execution screens of the plurality of applications mapped to the third icon and may display the execution screens of the plurality of applications on the second area, depending on the configured multi-window layout.

According to an embodiment of the disclosure, the electronic device 201 may allow a user to configure a multi-window layout desired by the user, may map and store the configured multi-window layout to the icon based on the user input, and may display the icon on the edge panel area to quickly configure and provide the multi-window layout by means of only a simple operation of selecting the icon when the user wants to use the same multi-window layout, thus improving the availability of the multi-window layout.

According to an embodiment of the disclosure, the electronic device 201 may determine the shape of the icon to which the multi-window layout is mapped based on the location of each of the plurality of windows of the multi-window layout mapped to the icon and the structure of the plurality of windows, such that the user may intuitively recognize the multi-window layout mapped to the corresponding icon from the shape of the icon.

Hereinafter a description will be given of a configuration and an operation of a software module of an electronic device according to an embodiment with reference to FIG. 3.

Figure 3:
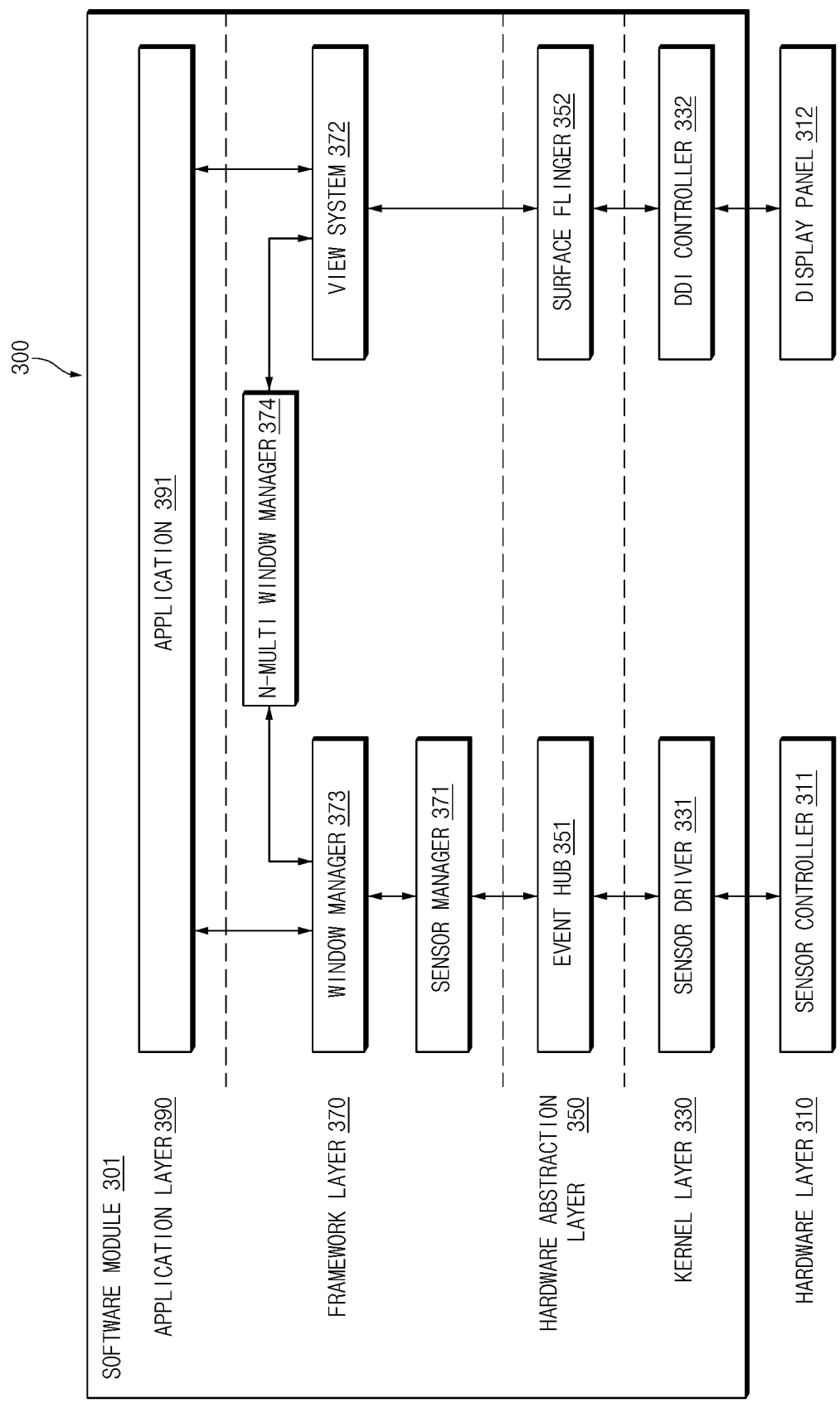
FIG. 3 is a block diagram illustrating a software module of an electronic device according to an embodiment of the disclosure.

FIG. 3 is a block diagram 300 illustrating a software module of an electronic device according to an embodiment of the disclosure. Operations of a software module 301, which will be described below, may be performed by an electronic device (e.g., an electronic device 201 of FIG. 2) or a processor (e.g., a processor 230 of FIG. 2) of the electronic device.

Referring to FIG. 3, the software module 301 may include a kernel layer 330, a hardware abstraction layer (HAL) 350, a framework layer 370, and an application layer 390. The software module 301 may obtain information based on at least one hardware module included in the hardware layer 310 and may control the at least one hardware module.

According to an embodiment of the disclosure, the hardware layer 310 may include a sensor controller (e.g., a sensor module 176 of FIG. 1 or a sensor 210 of FIG. 2) and a display panel 312 (e.g., a display module 160 of FIG. 1 or a display 220 of FIG. 2).

According to an embodiment of the disclosure, the software module 301 may identify a state of the electronic device or a change in the state based on the sensor controller 311. For example, when the display panel 312 is a foldable display panel, the software module 301 may identify a folding state of the electronic device based on the sensor controller 311. For another example, when the display panel 312 is a rollable display panel, the software module 301 may identify a rolling state of the electronic device based on the sensor controller 311.

According to an embodiment of the disclosure, the software module 301 may display content (e.g., an execution screen of an application 391 or the like) on the display panel 312.

According to an embodiment of the disclosure, the kernel layer 330 may include various drivers for controlling various hardware modules included in the electronic device. For example, the kernel layer 330 may include a sensor driver 331. The sensor driver 331 may include an interface module which controls the sensor controller 311.

According to an embodiment of the disclosure, the kernel layer 330 may include a display driver integrated chip (DDI) controller 332. The DDI controller 332 may process a control signal for driving the display panel 312 and may deliver the processed signal to the display panel 312. According to an embodiment of the disclosure, the DDI controller 332 may correspond to a display driver integrated circuit.

According to an embodiment of the disclosure, the hardware abstraction layer (HAL) 350 may refer to an abstracted layer between a plurality of hardware modules included in the hardware layer and the software module of the electronic device. For example, the hardware abstraction layer 350 may include an event hub 351 and a surface flinger 352.

According to an embodiment of the disclosure, the event hub 351 may include an interface module which standardizes an event which occurs in a sensor module (e.g., the sensor controller 311), such as a touch module, or the like.

According to an embodiment of the disclosure, the surface flinger 352 may synthesize a plurality of layers. According an embodiment of the disclosure, the surface flinger 352 may provide the DDI controller 332 with data indicating the plurality of synthesized layers. According to an embodiment of the disclosure, the layer may include a window. According ing an embodiment of the disclosure, the surface flinger 352 may synthesize a plurality of windows and may provide the DDI controller 332 with data indicating the plurality of windows, thus supporting a multi-window mode of the electronic device.

According to an embodiment of the disclosure, the framework layer 370 may perform a function of connecting the application layer 390 with the hardware abstraction layer 350. For example, the framework layer 370 may include a sensor manager 371, a view system 372, a window manager 373, and an N-multi window manager 374.

According to an embodiment of the disclosure, the sensor manager 371 may include a module which controls a sensor (e.g., the sensor controller 311) based on availability of the sensor in the application 391.

According to an embodiment of the disclosure, when the change in the state of the electronic device is identified by means of the sensor module (e.g., the sensor controller 311), the window manager 373 may deliver information of a display area of the display (e.g., the display panel 312) corresponding to the changed state of the electronic device to the application 391. For example, the information of the display area of the display may include resolution, a size, an aspect ratio, or the like and may correspond to the display feature information described above with reference to FIG. 2.

According to an embodiment of the disclosure, when the change in the state of the electronic device is identified, the window manager 373 may deliver the display feature information to an application, continuity of which is set, among one or more applications which are running. According to an embodiment of the disclosure, the window manager 373 may deliver the display feature information to the view system 372.

According to an embodiment of the disclosure, the view system 372 may draw at least one layer based on the resolution of the display area of the display (e.g., the display panel 312). For example, the view system 372 may generate at least one window based on the resolution of the display area of the display (e.g., the display panel 312).

According to an embodiment of the disclosure, the N-multi window manager 374 may include a module which controls a multi-window based on the user input. For example, the N-multi window manager 374 may determine and provide a multi-window layout for the plurality of windows to the view system 372. According to an embodiment of the disclosure, the N-multi window manager 374 may determine the multi-window layout based on the display feature information delivered from the window manager 373.

According to an embodiment of the disclosure, the application layer 390 may include the one or more applications 391. According to an embodiment of the disclosure, the application 391 may draw at least one layer based on the resolution of the display (e.g., the display panel 312) using at least one drawing library (e.g., the view system 372). For example, the application 391 may generate at least one window to which an execution screen of the application 391 is mapped by means of the view system 372.

Hereinafter, a description will be given of various examples of a multi-window layout provided by an electronic device (e.g., an electronic device 201 of FIG. 2) according to an embodiment with reference to FIG. 4. The operations of the electronic device, which will be described below, may be performed by a processor (e.g., a processor 230 of FIG. 2) of the electronic device.

Figure 4:
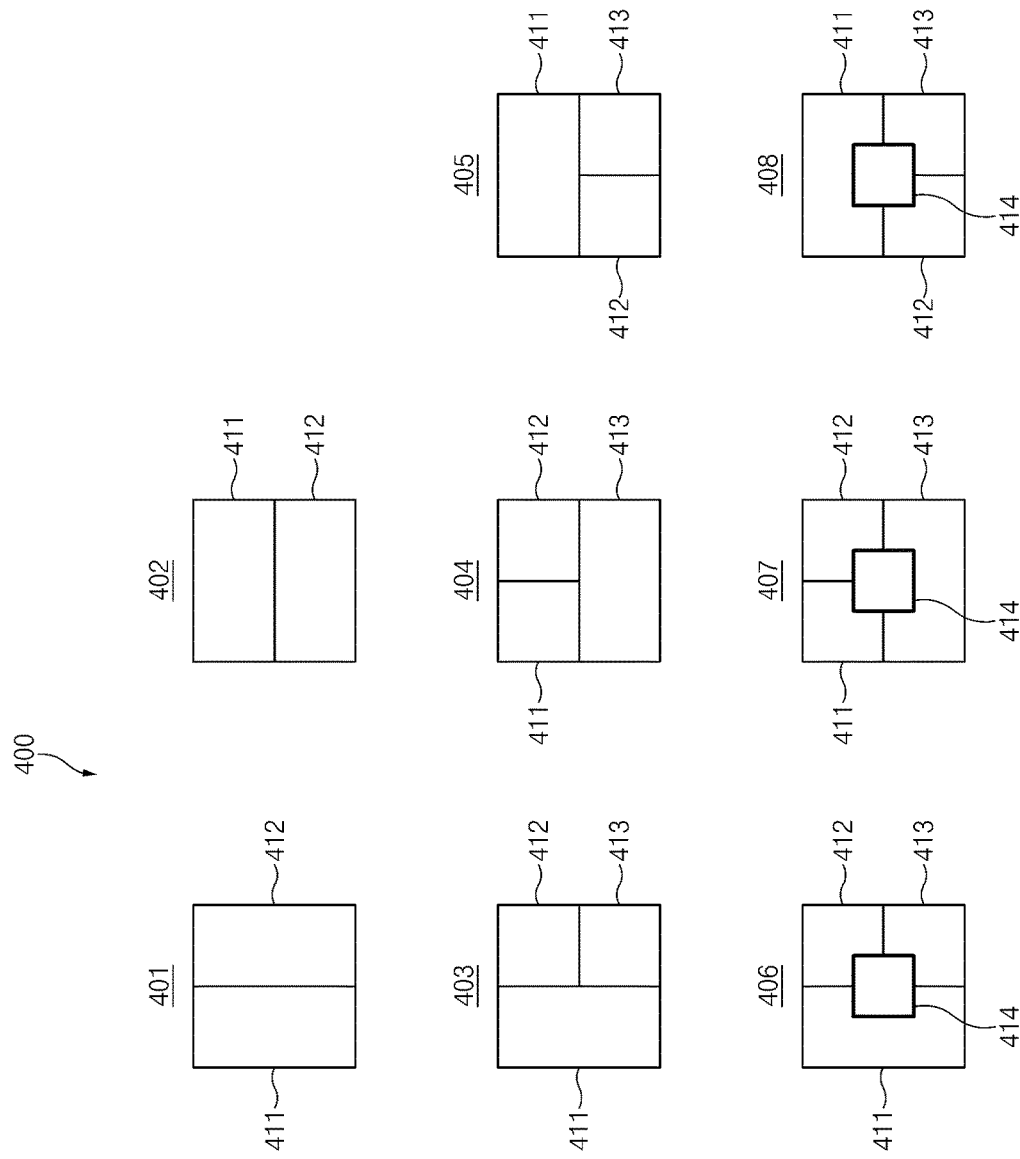
FIG. 4 is a drawing illustrating various multi-window layouts according to an embodiment of the disclosure.

FIG. 4 is a drawing 400 illustrating various multi-window layouts according to an embodiment of the disclosure. A first mode 401 and a second mode 402 of FIG. 4 indicate an example of a two-split multi-window layout. A third mode 403, a fourth mode 404, and a fifth mode 405 of FIG. 4 indicate an example of a three-split multi-window layout. A sixth mode 406, a seventh mode 407, and an eighth mode 408 of FIG. 4 indicate an example of a four-split multi-window layout including a pop-up window (or a floating window), but the multi-window layout is not limited to only the example shown in FIG. 4. The electronic device may provide an N-split multi-window mode with various layouts.

Referring to FIG. 4, in the first mode 401 and the second mode 402, the electronic device may provide a multi-window layout including a first window 411 and a second window 412. In the first mode 401, the electronic device may provide a multi-window layout where the first window 411 and the second window 412 are arranged from side to side. In the second mode 402, the electronic device may provide a multi-window layout where the first window 411 and the second window 412 are arranged up and down.

In the third mode 403, the fourth mode 404, and the fifth mode 405, the electronic device may provide a multi-window layout including the first window 411, the second window 412, and a third window 413. In the third mode 403, the electronic device may provide a multi-window layout where the first window 411 is disposed at its left side and where the second window 412 and the third window 413 are arranged up and down at its right side. In the fourth mode 404, the electronic device may provide a multi-window layout where the first window 411 and the second window 412 are arranged from side to side on the top and where the third window 413 is disposed on the bottom. In the fifth mode 405, the electronic device may provide a multi-window layout where the first window 411 is disposed on the top and where and the second window 412 and the third window 413 are arranged from side to side on the bottom.

In the sixth mode 406, the seventh mode 407, and the eighth mode 408, the electronic device may provide a multi-window layout including the first window 411, the second window 412, the third window 413, and a fourth window 414. In the sixth mode 406, the electronic device may provide a multi-window layout where the first window 411 is disposed at its left side, where the second window 412 and the third window 413 are arranged up and down at its right side, and where the fourth window 414 is disposed in the center as a pop-up window. In the seventh mode 407, the electronic device may provide a multi-window layout where the first window 411 and the second window 412 are arranged from side to side on the top, where the third window 413 is disposed on the bottom, and where the fourth window 414 is disposed in the center as a pop-up window. In the eighth mode 408, the electronic device may provide a multi-window layout where the first window 411 is disposed on the top, where the second window 412 and the third window 413 are arranged from side to side on the bottom, and where the fourth window 414 is disposed in the center as a pop-up window.

According to an embodiment of the disclosure, the electronic device may adjust sizes of the first window 411, the second window 412, the third window 413, and the fourth window 414 at each of the multi-window modes based on a setting input of a user. For example, the setting input of the user for adjusting the size of the window may be a gesture dragging a border line between the windows from side to side or up and down. According to an embodiment of the disclosure, the electronic device may adjust a location of the four window 414, which is a pop-up window, based on the setting input of the user. For example, the setting input of the user for adjusting the location of the pop-up window may be a gesture dragging the pop-up window up and down and from side to side.

Hereinafter, a description will be given of a method for generating and displaying an icon to which a multi-window layout is mapped in an electronic device according to an embodiment with reference. 5.

Figure 5:
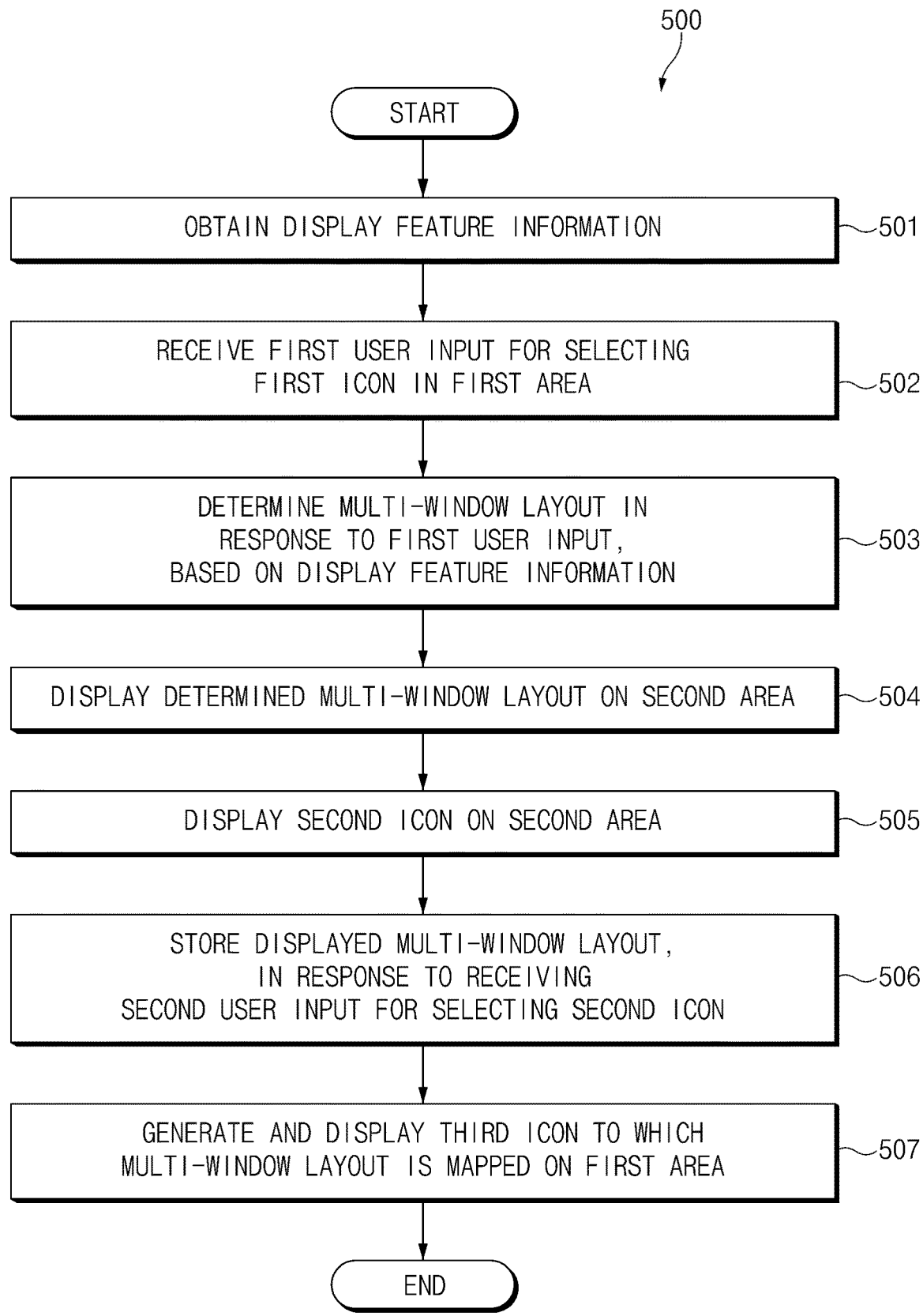
FIG. 5 is a flowchart illustrating an operation of an electronic device according to an embodiment of the disclosure.

FIG. 5 is a flowchart 500 illustrating an operation of an electronic device according to an embodiment of the disclosure. Operations of an electronic device (e.g., an electronic device 201 of FIG. 2), which will be described below, may be performed by a processor (e.g., a processor 230 of FIG. 2) of the electronic device.

Referring to FIG. 5, in operation 501, the electronic device may obtain display feature information. According to an embodiment of the disclosure, the electronic device may obtain display feature information of a display (e.g., a display 220 of FIG. 2) based on a state of the electronic device, which is identified by a sensor (e.g., a sensor 210 of FIG. 2). For example, the display feature information may include the display enabled according to the state of the electronic device and resolution, a size, an aspect ratio, or the like of the enabled display.

For example, when the display of the electronic device is a foldable display, the electronic device may vary in display which is enabled according to a folding state (a folded state or an unfolded state) of the electronic device. According an embodiment of the disclosure, the electronic device may identify the folding state of the electronic device based on its sensor. The electronic device may identify a display enabled when the electronic device is in the folded state or the unfolded state and may obtain information, such as a size and resolution of the enabled display.

For another example, when the display of the electronic device is a rollable (or slidable) display, the electronic device may vary in size of the display enabled according to a rolling state (a rolling in state or a rolling out state) or a sliding state (a sliding in state or a sliding out state) of the electronic device. According an embodiment of the disclosure, the electronic device may identify the rolling state (or the sliding state) of the electronic device based on the sensor. The electronic device may obtain size information of the display enabled when the electronic device is in the rolling in state (the sliding in state) or the rolling out state (the sliding out state).

A description will be given of a method for obtaining display feature information in an electronic device including a foldable display or a rollable (slidable) display with reference to FIG. 6.

In operation 502, the electronic device may receive a first user input for selecting a first icon on a first area. For example, a display area of the display may include the first area and a second area. According to an embodiment of the disclosure, the first area may refer to an edge panel area, and the second area may refer to a main display area. According to an embodiment of the disclosure, the electronic device may display a list of application which facilitate a multi-window mode and an icon for executing the multi-window mode on the first area. According to an embodiment of the disclosure, the list of the applications which facilitate the multi-window mode may include at least one first icon for running the applications which facilitate the multi-window mode. According to an embodiment of the disclosure, the electronic device may run an application mapped to the first icon selected depending on receiving a first user input for selecting the first icon and may display an execution screen of the application on at least a portion of the second region. According to an embodiment of the disclosure, the first icon may be a single application icon to which one application is mapped.

According to an embodiment of the disclosure, the electronic device may run a plurality of applications depending on receiving the first user input for selecting the first icon corresponding to each of the plurality of applications a plurality of times and may display execution screens of the plurality of applications on the second area at the same time, thus configuring a multi-window layout.

According to an embodiment of the disclosure, depending on receiving the first user input for selecting the first icon, the electronic device may identify a lock state of the electronic device. For example, the display of the electronic device may be displaying a lock screen. According to an embodiment of the disclosure, the electronic device may fail to support a multi-window mode in the lock state. According to an embodiment of the disclosure, the electronic device may provide a user with a guide for releasing the lock state depending on receiving the first user input on the lock screen.

In operation 503, the electronic device may determine a multi-window layout in response to the first user input, based on the display feature information. For example, the first user input may be, but is not limited to, a drag and drop gesture selecting the first icon on the first area, dragging the first icon from the second area, and dropping the first icon to a specific location of the second area. The first user input may include the other touch inputs, a voice input, and a non-contact input using a pen which is one of input devices (e.g., an input module 150 of FIG. 1) of the electronic device (e.g., hover, an input for pressing a button of the pen, a gesture input using the pen, or the like). Hereinafter, a description will be given assuming that the first user input is drag and drop.

According to an embodiment of the disclosure, the electronic device may identify a location where the first icon is dropped to the second area. According to an embodiment of the disclosure, the electronic device may generate a window in response to the location where the identified icon is dropped and may map an execution screen of an application mapped to the first icon to the window. According to an embodiment of the disclosure, the electronic device may identify locations where a plurality of first icons are dropped and may generate a window corresponding to each of the identified locations to generate a plurality of windows. According an embodiment of the disclosure, the electronic device may map an application corresponding to each of the plurality of windows to each of the plurality of windows to determine a multi-window layout. According to an embodiment of the disclosure, the multi-window layout may refer to locations and structures of the plurality of windows to which the plurality of applications are mapped.

According to an embodiment of the disclosure, an electronic device may determine a multi-window layout based on the display feature information. For example, the electronic device may vary in multi-window mode which is possible according to a size of the display. For example, when the display of the electronic device is a foldable display, the electronic device may have a display in an unfolding state, which is greater in size than a display in a folding state. According to an embodiment of the disclosure, the foldable electronic device may support two-, three-, and four-split modes in the unfolding state and may support the two-split mode in the folding state. According to an embodiment of the disclosure, the foldable electronic device may provide the two-split mode as left and right arrangement in the unfolding state and may provide the two-split mode as top and bottom arrangement in the folding state. According to an embodiment of the disclosure, the electronic device may differently determine a multi-window layout based on the display feature information, such as the size of the display. For example, in identifying the location where the first icon is dropped to the second area by the first user and generating the window corresponding to the identified location, although the same location is identified, the electronic device may differently generate a size, a structure, and arrangement of the window with regard to the multi-window layout which is possible according to the display feature information.

The foldable display is exemplified in the above-mentioned embodiment of the disclosure, but, because the display area of the display increases in size when the display changes from a rolling in state to a rolling out state even when the display is a rollable display, it may be applied in the same or similar manner.

In operation 504, the electronic device may display the multi-window layout determined in operation 503 on the second area. Operation 504 may be performed at the same time as operation 503.

Various examples of operations 502 to 504 will be described below with reference to FIGS. 8A to 8D.

In operation 505, the electronic device may display a second icon on the second area. According to an embodiment of the disclosure, the second area may refer to an area where the multi-window layout configured with the plurality of windows is displayed. According to an embodiment of the disclosure, the second icon may be an icon to which an operation of storing the multi-window layout displayed on the second area in the electronic device is mapped. According to an embodiment of the disclosure, the electronic device may display the second icon, thus allowing the user to store the multi-window layout configured by the user.

According to various embodiments of the disclosure, the electronic device may display a separate setting screen user interface (UI) for generating an icon to which the multi-window layout is mapped on the display area of the display, may determine the multi-window layout to which the plurality of applications are mapped based on a user input which is input through the setting screen user input (UI), and may map and store the determined multi-window layout to the icon.

In operation 506, depending on receiving a second user input for selecting the second icon, the electronic device may store the determined multi-window layout. For example, the second user input may be, but is not limited to, a tap, double tap, press, or swipe gesture. The second user input may include the other touch inputs, a voice input, and a non-contact input using a pen which is one of input devices (e.g., the input module 150 of FIG. 1) of the electronic device (e.g., hover, an input for pressing a button of the pen, a gesture input using the pen, or the like).

According to an embodiment of the disclosure, the electronic device may store the multi-window layout displayed on the second area and application information to which the multi-window layout is mapped in a memory (e.g., a memory 240 of FIG. 2).

In operation 507, depending on the second user input for selecting the second icon, the electronic device may generate a third icon to which the multi-window layout is mapped and may display the third icon on the first area. According to an embodiment of the disclosure, the electronic device may map and store the multi-window layout displayed on the second area and the application information to which the multi-window layout is mapped to the third icon. According to an embodiment of the disclosure, the third icon may be an icon to which an operation of configuring the multi-window layout mapped and stored to the third icon according to the selection input of the user by the electronic device and displaying the multi-window layout on the second area is mapped.

According an embodiment of the disclosure, the electronic device may combine the plurality of first icons for respectively running the plurality of applications mapped to the multi-window layout displayed on the second area to generate the third icon. For example, when a first application is mapped to a first window, when a second application is mapped to a second window, and when a third application is mapped to a third window, the electronic device may combine an icon for running the first application, an icon for running the second application, and an icon for running the third application to form the third icon.

According to an embodiment of the disclosure, the electronic device may determine a shape of the third icon based on the multi-window layout displayed on the second area. For example, when the first window is disposed at a left side of the display area and when the second window and the third window are arranged up and down at a right side of the display area, the electronic device may arrange the icon for running the first application mapped to the first window at a left side of the third icon and may arrange the icon for running the second application mapped to the second window and the icon for running the third application mapped to the third window up and down at a right side of the third icon, thus forming the third icon.

Various examples of operations 504 to 507 will be described below with reference to FIGS. 9A to 9C.

Hereinafter, a description will be given of a method for obtaining display feature information in an electronic device according to various embodiments with reference to FIG. 6.

Figure 6:
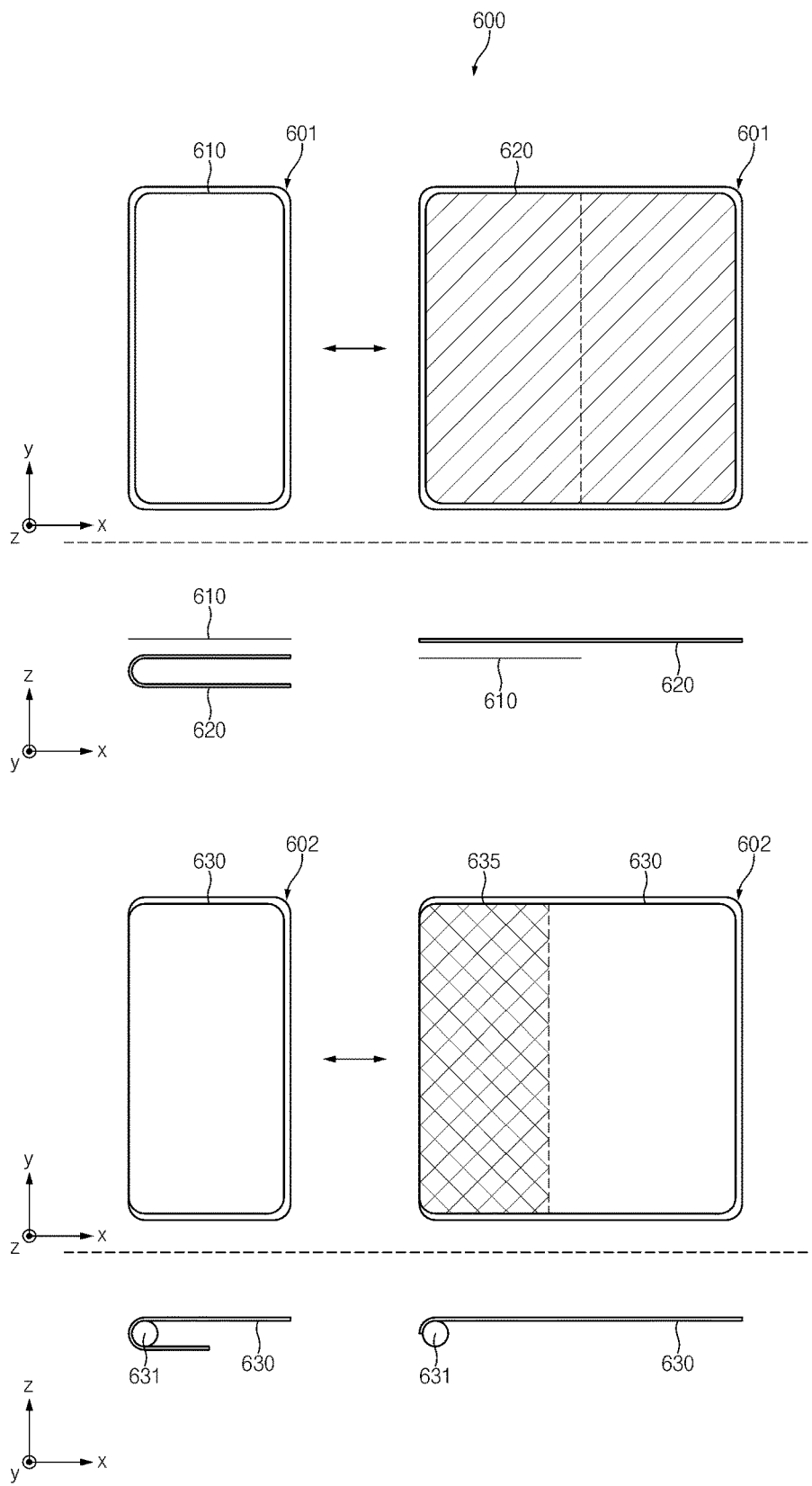
FIG. 6 is a drawing illustrating a method for obtaining display feature information in an electronic device according to an embodiment of the disclosure.

FIG. 6 is a drawing 600 illustrating a method for obtaining display feature information in an electronic device according to an embodiment according to an embodiment of the disclosure. An electronic device 601 of FIG. 6 is a foldable electronic device, and an electronic device 602 of FIG. 6 is a rollable (slidable) electronic device.

Referring to FIG. 6, the electronic device 601 including a foldable display may include a first display 610 and a second display 620. The first display 610 and the second display 620 may be arranged on the electronic device 601 to expose display areas in opposite directions. According to an embodiment of the disclosure, the second display 620 may be a foldable display.

Operations of an electronic device 601 (e.g., an electronic device 201 of FIG. 2), which will be described below, may be performed by a processor (e.g., a processor 230 of FIG. 2) of the electronic device 601. Operations of an electronic device 602, which will be described below, may be performed by a processor (e.g., the processor 230 of FIG. 2) of the electronic device 602.

According to an embodiment of the disclosure, the electronic device 601 may be a folding state (or a folded state) as shown at the left side and may change to an unfolding state (or an unfolded state) as shown at the right side. The electronic device 601 may display content on a display area of the first display 610 in the folding state and may display the content on a display area of the second display 620 in the unfolding state.

According to an embodiment of the disclosure, the electronic device 601 may determine that the first display 610 is enabled, as it is identified that the electronic device 601 is in the folding state by a sensor (e.g., a sensor 210 of FIG. 2), and may determine that the second display 620 is enabled, as it is identified that the electronic device 601 is in the unfolding state by the sensor. According to an embodiment of the disclosure, the electronic device 601 may obtain information of whether the enabled display is the first display 610 or the second display 620.

According to an embodiment of the disclosure, the electronic device 601 may obtain information of at least one of resolution, a size, or an aspect ratio of the first display 610 in the folding state and may obtain information of at least one of resolution, a size, or an aspect ratio of the second display 620 in the unfolding state.

Referring to FIG. 6, the electronic device 602 may include a rollable (slidable) display 630. The rollable display 630 or the slidable display 630 may be wound on a roll 631 which is a cylindrical structure. A state where at least a part of the rollable display 630 is wound on the roll 631 may be referred to as a rolling in state, and a state where at least a part of the rollable display 630, which is wound on the roll 631, is unwound from the roll 631 may be referred to as a rolling out state. As the at least a part of the rollable display 630 is wound on the roll 631, the remaining portion which is not wound on the roll 631 may slide. Thus, the rolling in state may be otherwise referred to as a sliding in state, and the rolling out state may be otherwise referred to as a sliding out state.

According to an embodiment of the disclosure, the electronic device 602 may be the rolling in state (or the sliding in state) as shown at the left side and may mutually change to the rolling out state (or the sliding out state) as shown in the right side. The electronic device 602 may display, for example, content on a default display area of the display 630 in the rolling in state and may display the content on the default display area and an added display area 635 in the rolling out state. For example, the added display area 635 may refer to a display area of the display which is unfolded as the rollable display 630 rolls out while wound on the roll 631.

According to an embodiment of the disclosure, the electronic device 602 may determine that the display area of the rollable display 630 as the default display area, as it is identified that the electronic device 602 is in the rolling in state by the sensor, and may determine that the display area of the rollable display 630 includes the default display area and the added display area, as it is identified that the electronic device 602 is in the rolling out state by the sensor. According to an embodiment of the disclosure, the electronic device 602 may obtain information of whether there is the added display area 635 of the rollable display 630.

According to an embodiment of the disclosure, the electronic device 602 may obtain information of at least one of resolution, a size, or an aspect ratio of the default display area in the rolling in state and may obtain information of at least one of resolution, sizes, or aspect ratios of the default display area and the added display area in the rolling out state.

Hereinafter, a description will be given of a method for obtaining display feature information in an electronic device according to various embodiments with reference to FIG. 7.

Figure 7:
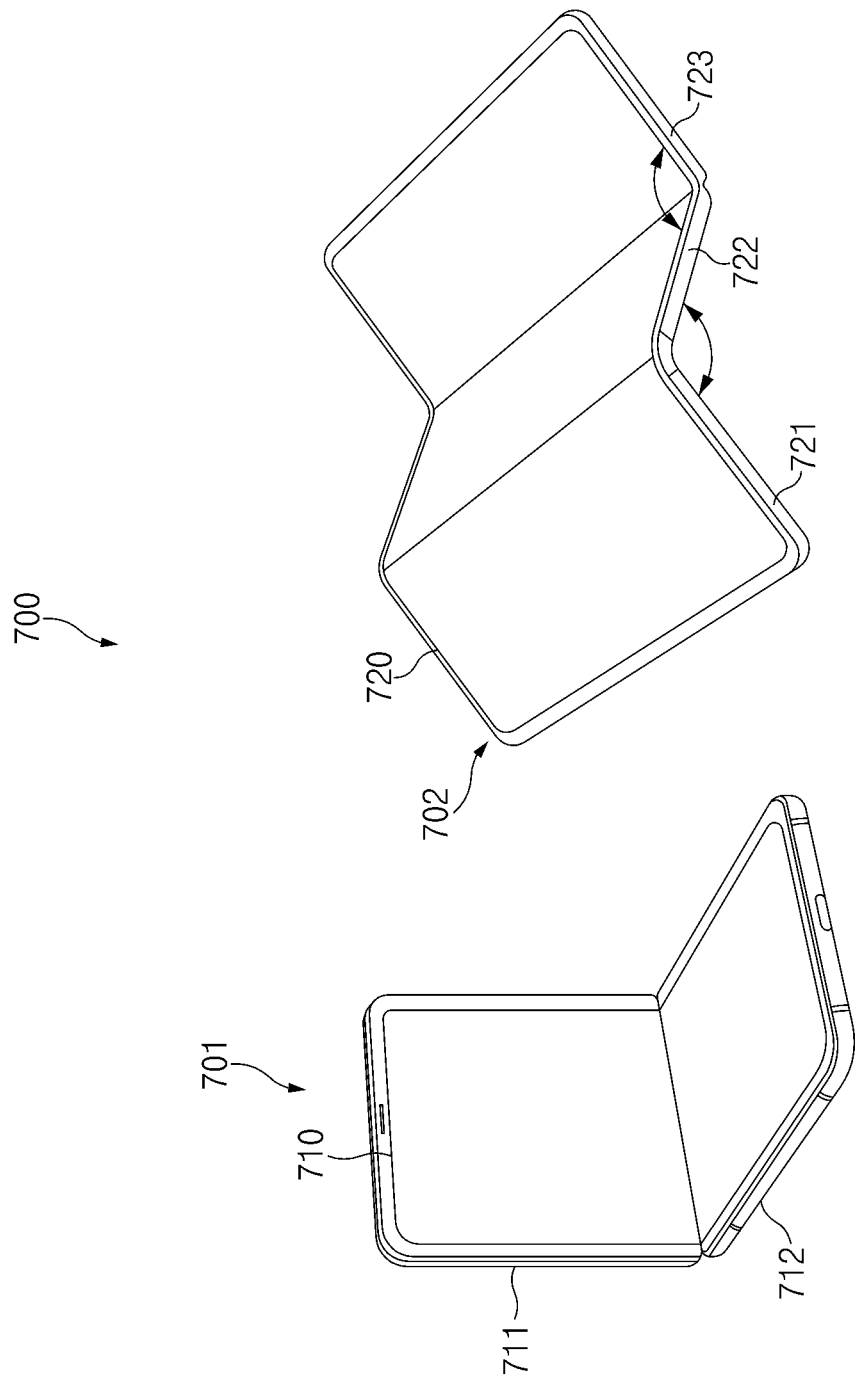
FIG. 7 is a drawing illustrating operation 501 of FIG. 5 according to an embodiment of the disclosure.

FIG. 7 is a drawing 700 illustrating operation 501 of FIG. 5 according to an embodiment of the disclosure. Both of an electronic device 701 and an electronic device 702 of FIG. 7 may include a foldable display, but may have different form factors.

Operations of the electronic device 701, which will be described below, may be performed by a processor (e.g., a processor 230 of FIG. 2) of the electronic device 701. Operations of the electronic device 702, which will be described below, may be performed by a processor (e.g., the processor 230 of FIG. 2) of the electronic device 702.

Referring to FIG. 7, the electronic device 701 may include a first housing 711, a second housing 712, and a display 710. According to an embodiment of the disclosure, the display 710 may be folded or unfolded according to movement of at least one of the first housing 711 or the second housing 712. According to an embodiment of the disclosure, the electronic device 701 may be folded such that the display 710 disposed on the first housing 711 and the display 710 disposed on the second housing 712 face with each other. Such a folding scheme may be referred to as an in-folding scheme.

According to another embodiment of the disclosure, the electronic device 701 may be folded such that the display 710 disposed on the first housing 711 and the display 710 disposed on the second housing 712 face with each other in opposite directions. Such a folding scheme may be referred to as an out-folding scheme. For example, when the electronic device 701 is folded in the outer-folding scheme, only a display area of the display 710 disposed on the first housing 711 or a display area of the display 710 disposed on the second housing 712 may be enabled in a state where the electronic device 701 is fully folded, and the entire display area of the display 710 may be enabled as the electronic device 701 is unfolded at a certain angle or more.

According to an embodiment of the disclosure, when the electronic device 701 is in the in-folding scheme, it may identify that the display 710 is enabled, as the first housing 711 and the second housing 712 are unfolded, and may obtain display feature information including at least one of resolution, a size, or an aspect ratio of the display area of the display 710.

According to another embodiment of the disclosure, when the electronic device 701 is in the outer-folding scheme, the enabled display area of the display 710 may be reduced as the first housing 711 and the second housing 712 are folded, and the enabled display area of the display 710 may be expanded as the first housing 711 and the second housing 712 are unfolded. The electronic device 701 may obtain display feature information including at least one of resolution, a size, or an aspect ratio of the enabled display area of the display 710.

Referring to FIG. 7, the electronic device 702 may include a first housing 721, a second housing 722, a third housing 723, and a display 720. According to an embodiment of the disclosure, the display 720 may be folded or unfolded according to movement of at least one of the first housing 721, the second housing 722, or the third housing 723. According embodiment of the disclosure, the electronic device 702 may be folded such that the display 720 disposed on the first housing 721 and the display 720 disposed on the second housing 722 face with each other in opposite directions. Such a folding scheme may be referred to as an out-folding scheme. According to an embodiment of the disclosure, the electronic device 702 may be folded such that the display 720 disposed on the second housing 722 and the display 720 disposed on the third housing 723 face with each other (in-folding). According to an embodiment of the disclosure, the electronic device 702 may have a form factor including both of in-folding and out-folding. For example, the form factor where a part of the display 720 is in-folded and the other is out-folded may be referred to as a Z-folding structure.

According to an embodiment of the disclosure, when the first housing 721 and the second housing 722 are in an unfolding state and when the second housing 722 and the third housing 723 are in an in-folding state, the electronic device 702 may identify that the display area of the display 720 disposed on the first housing 721 is enabled and may obtain display feature information, such as resolution, a size, or an aspect ratio of the display area of the display 720 disposed on the first housing 721.

According to an embodiment of the disclosure, when the first housing 721 and the second housing 722 are in the unfolding state and when the second housing 722 and the third housing 723 are in the unfolding state, the electronic device 702 may identify that the display area of the display 720 disposed on the second housing 722 and the third housing 723 is enabled and may obtain display feature information, such as resolution, a size, or an aspect ratio of the display area of the display 720 disposed on the second housing 722 and the third housing 723. According to an embodiment of the disclosure, the display area of the display 720 disposed on the second housing 722 and the third housing 723 may be greater in size than the display area of the display 720 disposed on the first housing 721.

According to an embodiment of the disclosure, when the first housing 721 and the second housing 722 are in the unfolding state and when the second housing 722 and the third housing 723 are in the unfolding state, the electronic device 702 may identify that the display area of the display 720 disposed on the first housing 721, the second housing 722, and the third housing 723 is enabled and may obtain display feature information, such as resolution, a size, or an aspect ratio of the display area of the display 720 disposed on the first housing 721, the second housing 722, and the third housing 723. According to an embodiment of the disclosure, the display area of the display 720 disposed on the second housing 722 and the third housing 723 may be greater in size than the display area of the display 720 disposed on the second housing 722 and the third housing 723.

According to the above-mentioned embodiments of the disclosure, the electronic device may obtain display information depending on various form factors. The foldable electronic device is exemplified in the above-mentioned embodiment of the disclosure, but not limited thereto. For example, display information based on various form factors of a rollable electronic device may be obtained.

Hereinafter, a description will be given of a method for determining a multi-window layout in an electronic device according to an embodiment with reference to FIGS. 8A to 8D.

FIGS. 8A, 8B, 8C, and 8D are drawings 800, 820, 830, and 840 illustrating operations 502 to 504 of FIG. 5 according to various embodiments of the disclosure. Operations of an electronic device 810 (e.g., an electronic device 201 of FIG. 2), which will be described below, may be performed by a processor (e.g., a processor 230 of FIG. 2) of the electronic device 810.

Referring to FIGS. 8A to 8D, the electronic device 810 may include a display 860. The display 860 may be, for example, a foldable display. The electronic device 810 may display content (e.g., an execution screen of an application) on a display area 880 of the display 860. The display area 880 may include a first area 881 and a second area 882. According to an embodiment of the disclosure, the first area 881 may be an edge panel area, and the second area 882 may be a main area. For example, the electronic device 810 may display an icon for running one or more applications on the first area 881. According to an embodiment of the disclosure, the icon displayed on the first area 881 may include a plurality of first icons for running one or more applications which support a multi-window mode. According to an embodiment of the disclosure, depending on receiving a user input for selecting the icon displayed on the first area 881, the electronic device 810 may display an execution screen of the application mapped to the icon on the second area 882. According to an embodiment of the disclosure, depending on receiving a first user input for selecting the first icon, the electronic device 810 may configure a split window on the second area 882 and may map the application mapped to the first icon to the configured split window.

Figure 8A:
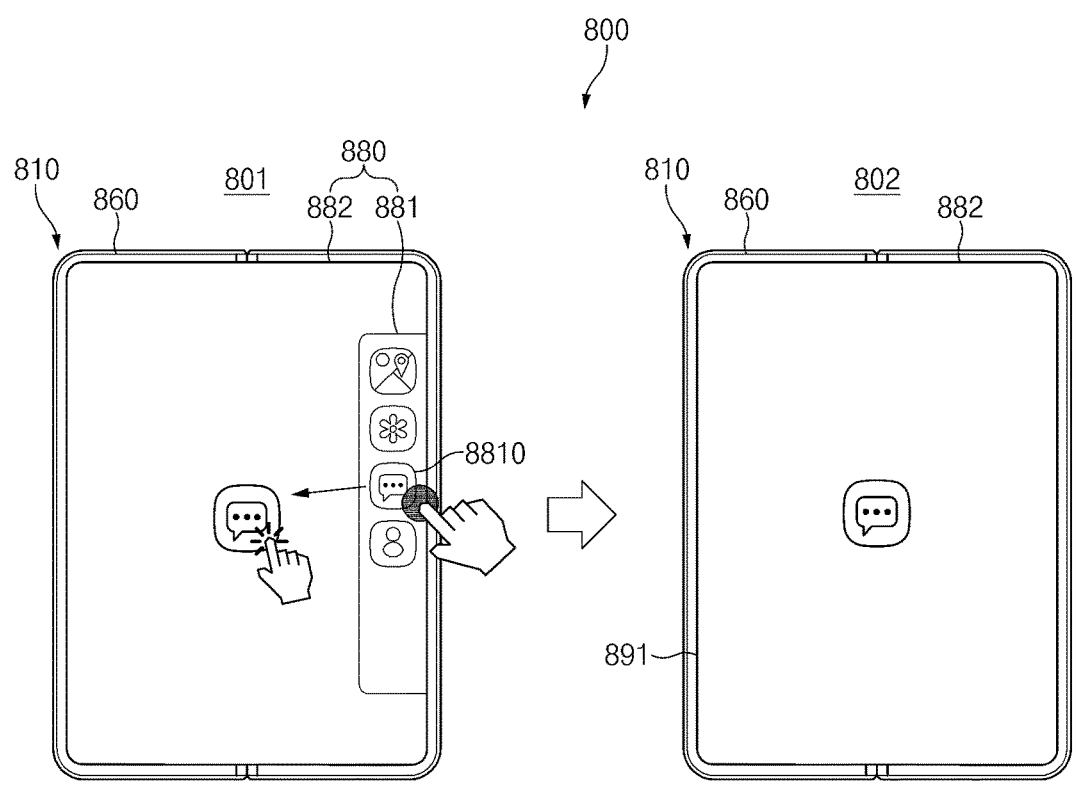
FIGS. 8A, 8B, 8C, and 8D are drawings illustrating operations 502 to 504 of FIG. 5 according to various embodiments of the disclosure.
Figure 8A:
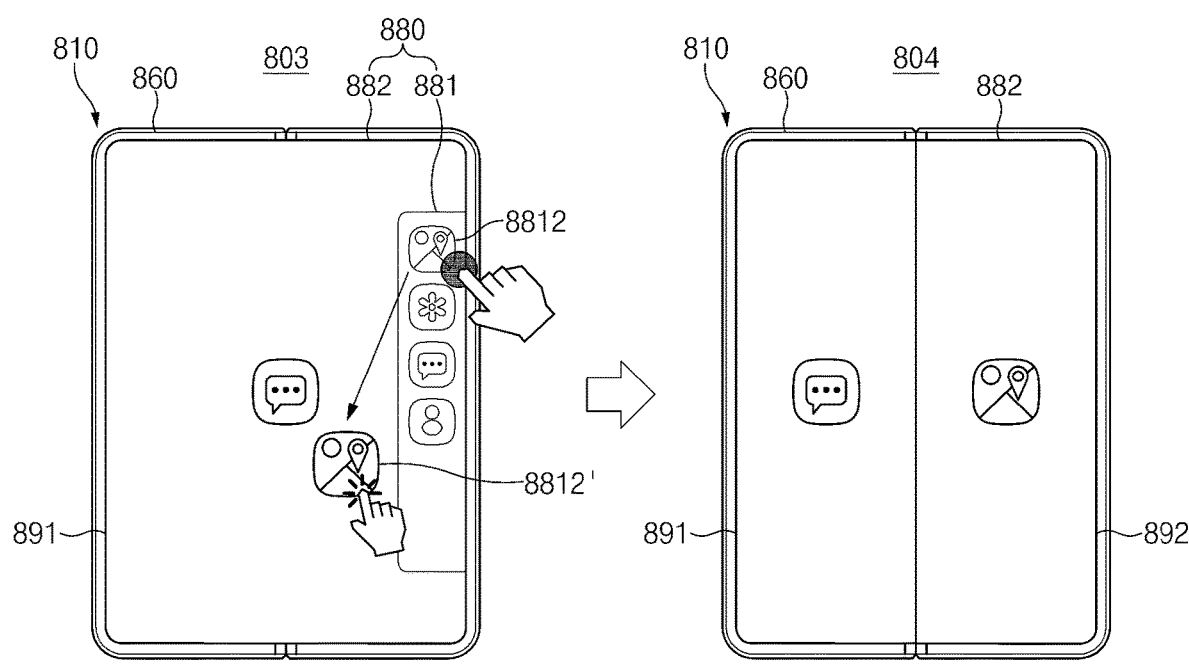

Referring to FIG. 8A, in a first state 801, the electronic device 810 may drag a first icon 8810 to which a first application is mapped from the first area 881 to the second area 882 and may receive a first user input for dropping the first icon 8810 into the second area 882. According to an embodiment of the disclosure, the electronic device 810 may determine whether there is an execution screen of an application, which is displayed on the second area 882. As there is no execution screen of the application, which is displayed on the second area 882, the electronic device 810 may generate a first window 891 displayed as a full screen on the second area 882 in response to the first user input and may map the execution screen of the first application to the first window 891.

In a second state 802, the electronic device 810 may display the first window 891 to which the first application is mapped as the full screen on the second area 882.

According to an embodiment of the disclosure, depending on receiving a user input to which an operation of displaying the first area 881 is mapped, the electronic device 810 may display the first area 881 again. The user input to which the operation of displaying the first area 881 is mapped may include, for example, but is not limited to, a flick gesture for moving in a direction of being away from an edge from the edge. Although not illustrated in FIG. 8A, for example, the electronic device 810 may display an edge handler in the second state 802 and a fourth state 804 and may display the first area 881 depending on receiving an input for dragging the edge handler in a direction of being away from the edge. In a third state 803, the electronic device 810 may drag the first icon 8812 to which a second application is mapped from the first area 881 to the second area 882 and may receive a first user input for dropping the first icon 8810 to a first location 8812' of the second area 882. According to an embodiment of the disclosure, as there is the execution screen of the application (e.g., the execution screen of the first application), which is displayed on the second area 882, the electronic device 810 may configure a multi-window layout in response to the first location 8812' where the first user input is detected. For example, the electronic device 810 may display the first window 891 as a split screen at a left side of the second area 882 in response to the first location 8812' based on the display feature information and may generate a second window 892 at a right side of the second area 882. The electronic device 810 may map a second application to the generated second window 892.

In the fourth state 804, the electronic device 810 may display the first window 891 to which the first application is mapped as a split screen at the left side of the second area 882 and may display the second window 892 to which the second application is mapped as a split screen at the right side of the second area 882.

According to the embodiment shown in FIG. 8A, the electronic device 810 may determine a two-split multi-window layout where the first window 891 to which the first application is mapped and the second window 892 to which the second application is mapped are arranged from side to side on the second area 882.

Figure 8B:
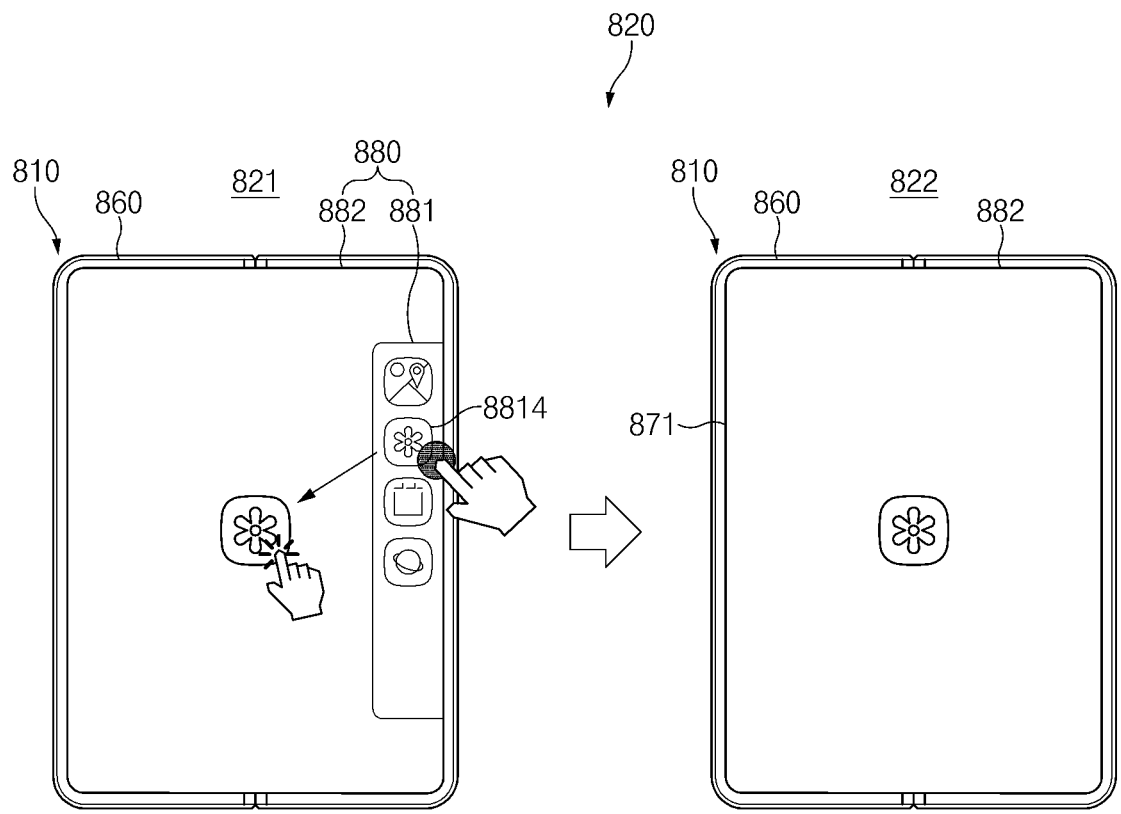
Figure 8B:
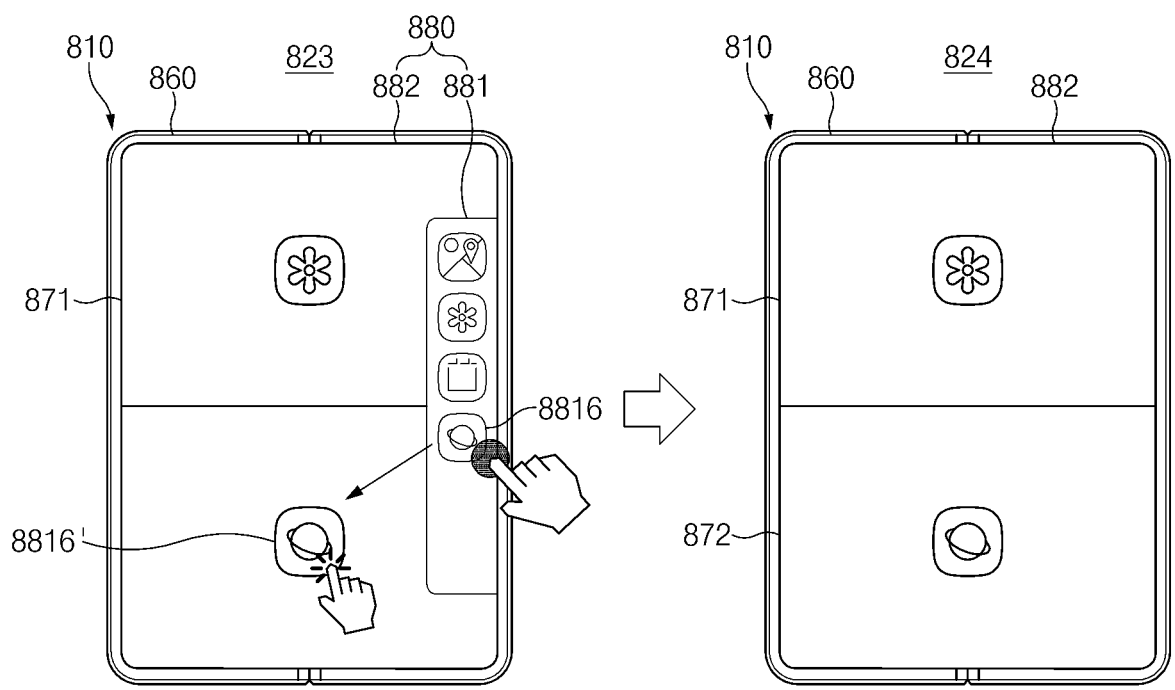

Referring to FIG. 8B, in a first state 821, the electronic device 810 may drag a first icon 8814 to which a third application is mapped from the first area 881 to the second area 882 and may receive a first user input for dropping the first icon 8814 into the second area 882. According to an embodiment of the disclosure, the electronic device 810 may determine whether there is an execution screen of an application displayed on the second area 882. As there is no execution screen of the application, which is displayed on the second area 882, the electronic device 810 may generate a first window 871 displayed as a full screen on the second area 882 in response to the first user input and may map the execution screen of the third application to the first window 871.

In a second state 822, the electronic device 810 may display the first window 871 to which the third application is mapped as the full screen on the second area 882.

According to an embodiment of the disclosure, depending on receiving a user input to which an operation of displaying the first area 881 is mapped, the electronic device 810 may display the first area 881 again. The user input to which the operation of displaying the first area 881 is mapped may include, for example, but is not limited to, a flick gesture for moving in a direction of being away from an edge from the edge. For example, although not illustrated in FIGS. 8B and 8C, the electronic device 810 may display an edge handler in the second state 822, a fourth state 824, and a sixth state 826 and may display the first area 881 depending on receiving an input for dragging the edge handler in a direction of being away from the edge.

In a third state 823, the electronic device 810 may drag a first icon 8816 to which a fourth application is mapped from the first area 881 to the second area 882 and may receive a first user input for dropping the first icon 8816 to a second location 8816' of the second area 882. According to an embodiment of the disclosure, as there is the execution screen of the application (e.g., the execution screen of the third application), which is displayed on the second area 882, the electronic device 810 may configure a multi-window layout in response to the second location 8816' where the first user input is detected. For example, the electronic device 810 may display the first window 871 as a split screen on the top of the second area 882 in response to the second location 8816' based on the display feature information and may generate a second window 872 on the bottom of the second area 882. The electronic device 810 may map the fourth application to the generated second window 872.

In the fourth state 824, the electronic device 810 may display the first window 871 to which the third application is mapped as a split screen on the top of the second area 882 and may display the second window 872 to which the fourth application is mapped as a split screen on the bottom of the second area 882.

According to an embodiment of the disclosure, depending on receiving a user input to which an operation of displaying the first area 881 is mapped, the electronic device 810 may display the first area 881 again.

Figure 8C:
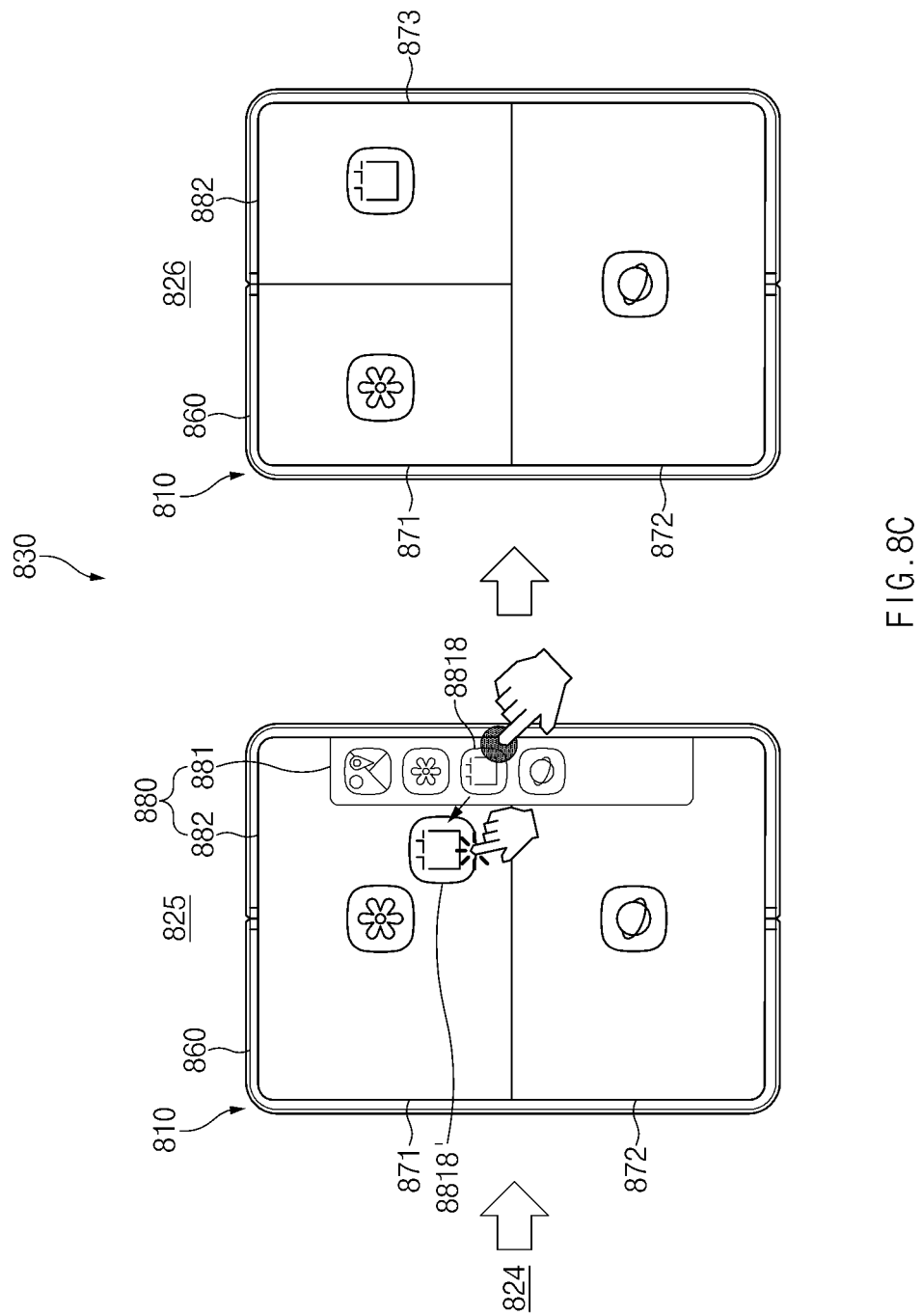

Referring to FIG. 8C, in a fifth state 825, the electronic device 810 may drag a first icon 8818 to which a fifth application is mapped from the first area 881 to the second area 882 and may receive a first user input for dropping the first icon 8818 to a third location 8818' of the second area 882. According to an embodiment of the disclosure, as there is the execution screen of the application (e.g., the execution screen of the third application or the execution screen of the fourth application), which is displayed on the second area 882, the electronic device 810 may configure a multi-window layout in response to the third location 8818' where the first user input is detected. For example, the electronic device 810 may display the first window 871 as a split screen at an upper left side of the second area 882 in response to the third location 8818' based on the display feature information and may generate a third window 873 at an upper right side of the second area 882. The electronic device 810 may map the fifth application to the generated third window 873.

In the sixth state 826, the electronic device 810 may display the second window 872 to which the fourth application is mapped as a split screen on the bottom of the second area 882, may display the first window 871 to which the third application is mapped as a split screen at an upper left side of the second area 882, and may display the third window 873 to which the fifth application is mapped as a split screen at an upper right side of the second area 882.

According to the embodiment shown in FIGS. 8B and 8C, the electronic device 810 may determine a three-split multi-window layout where the first window 871 to which the third application is mapped and the third window 873 to which the fifth application is mapped are arranged from side to side on the top of the second area 882 and the second window 872 to which the fourth application is mapped is disposed on the bottom of the second window 872.

Figure 8D:
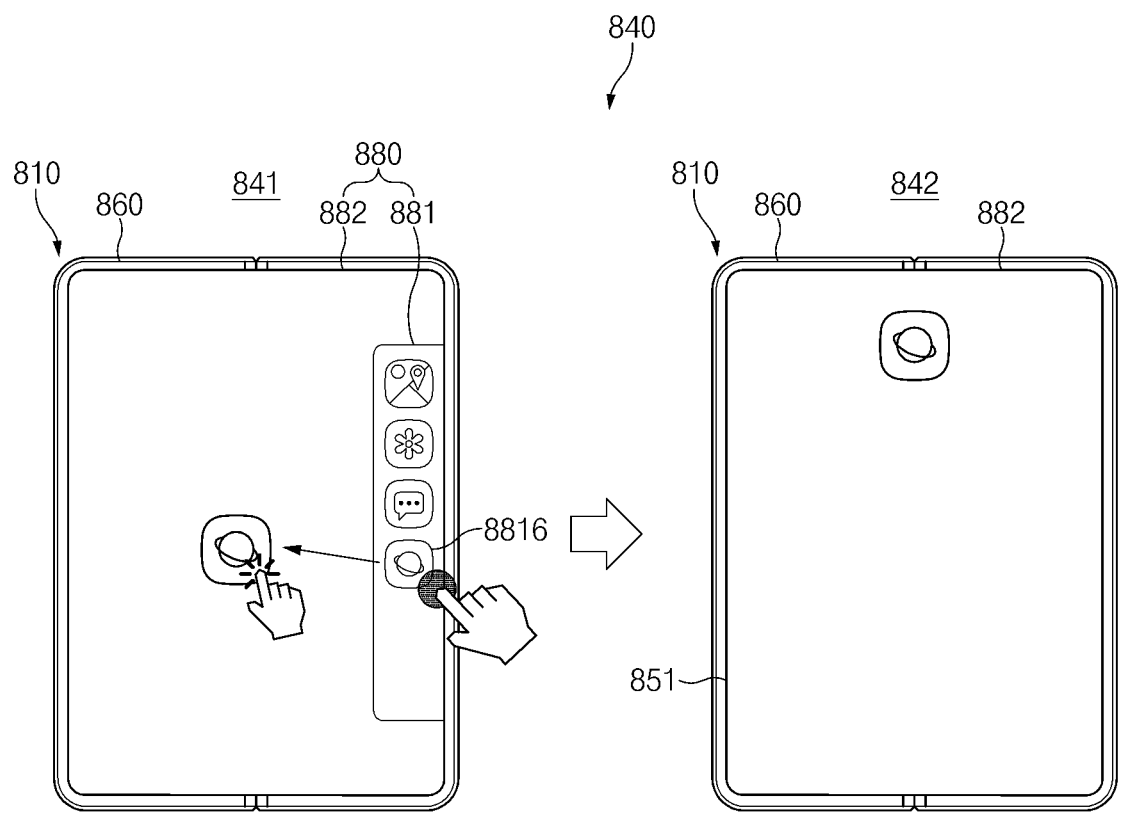
Figure 8D:
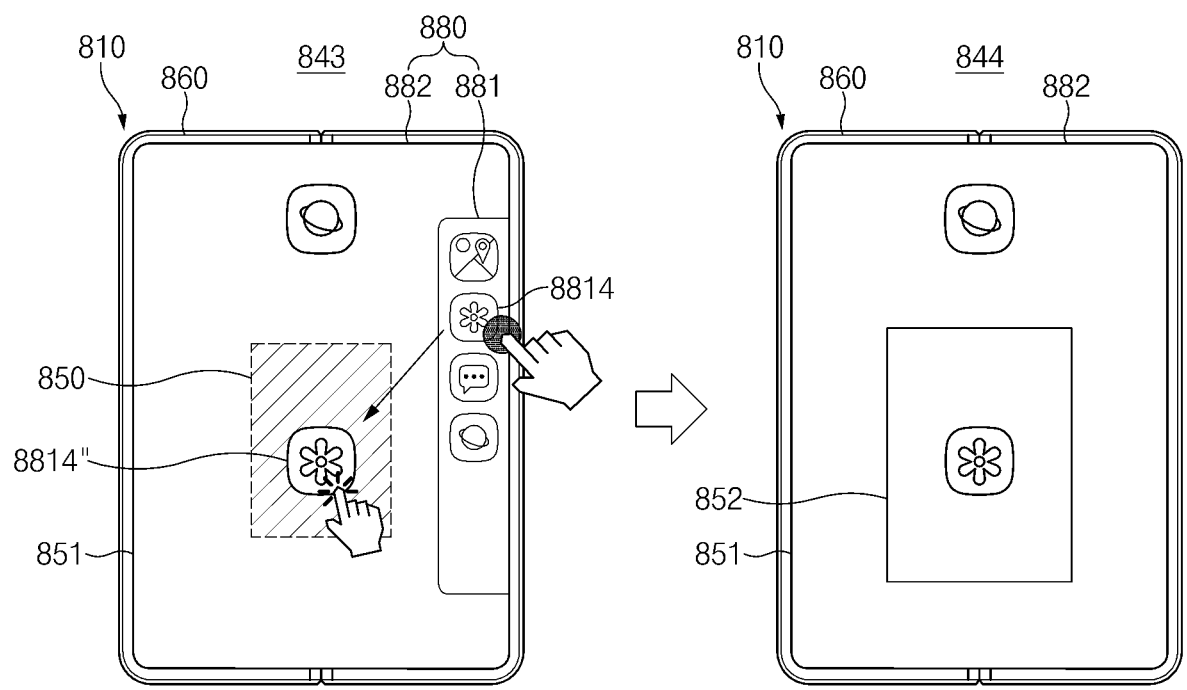

Referring to FIG. 8D, in a first state 841, the electronic device 810 may drag a first icon 8816 to which the fourth application is mapped from the first area 881 to the second area 882 and may receive a first user input for dropping the first icon 8816 into the second area 882. According to an embodiment of the disclosure, the electronic device 810 may determine whether there is an execution screen of an application, which is displayed on the second area 882. As there is no execution screen of the application, which is displayed on the second area 882, the electronic device 810 may generate a first window 851 displayed as a full screen on the second area 882 in response to the first user input and may map the execution screen of the fourth application to the first window 851.

In a second state 842, the electronic device 810 may display the first window 851 to which the fourth application is mapped as the full screen on the second area 882.

According to an embodiment of the disclosure, depending on receiving a user input to which an operation of displaying the first area 881 is mapped, the electronic device 810 may display the first area 881 again. The user input to which the operation of displaying the first area 881 is mapped may include, for example, but is not limited to, a flick gesture for moving in a direction of being away from an edge from the edge. For example, although not illustrated in FIG. 8D, the electronic device 810 may display an edge handler in the second state 842 and a fourth state 844 and may display the first area 881 depending on receiving an input for dragging the edge handler in a direction of being away from the edge.

In a third state 843, the electronic device 810 may drag a first icon 8814 to which the third application is mapped from the first area 881 to the second area 882 and may receive a first user input for dropping the first icon 8814 to a fourth location 8814" of the second area 882. According to an embodiment of the disclosure, as there is the execution screen of the application (e.g., the execution screen of the third application or the execution screen of the fourth application), which is displayed on the second area 882, the electronic device 810 may configure a multi-window layout in response to the second location 8816' where the first user input is detected.

According to an embodiment of the disclosure, the electronic device 810 may display a specified area 850 capable of generating a pop-up window on the second area 882. The electronic device 810 may generate a second window 852 as a pop-up screen on the second area 882 as the fourth location 8814" is located within the specified area 850 based on the display feature information. The electronic device 810 may generate the second window 892 to overlap the first window 891. The electronic device 810 may map the third application to the generated second window 852.

In the fourth state 844, the electronic device 810 may display the first window 851 to which the fourth application is mapped as a full screen on the second area 882 and may display the second window 852 to which the third application is mapped as a pop-up screen on the second area 882. The electronic device 810 may overlap and display the second window 852 with the first window 851.

According to the embodiment shown in FIG. 8D, the electronic device 810 may determine a two-split multi-window layout where the first window 851 to which the fourth application is mapped is disposed as a full screen on the second area 882 and where the second window 852 to which the third application is mapped is disposed as a pop-up screen on the second area 882.

Hereinafter, a description will be given of a method for generating and displaying an icon to which a multi-window layout is mapped in an electronic device according to an embodiment with reference to FIGS. 9A to 9C.

Figure 9A:
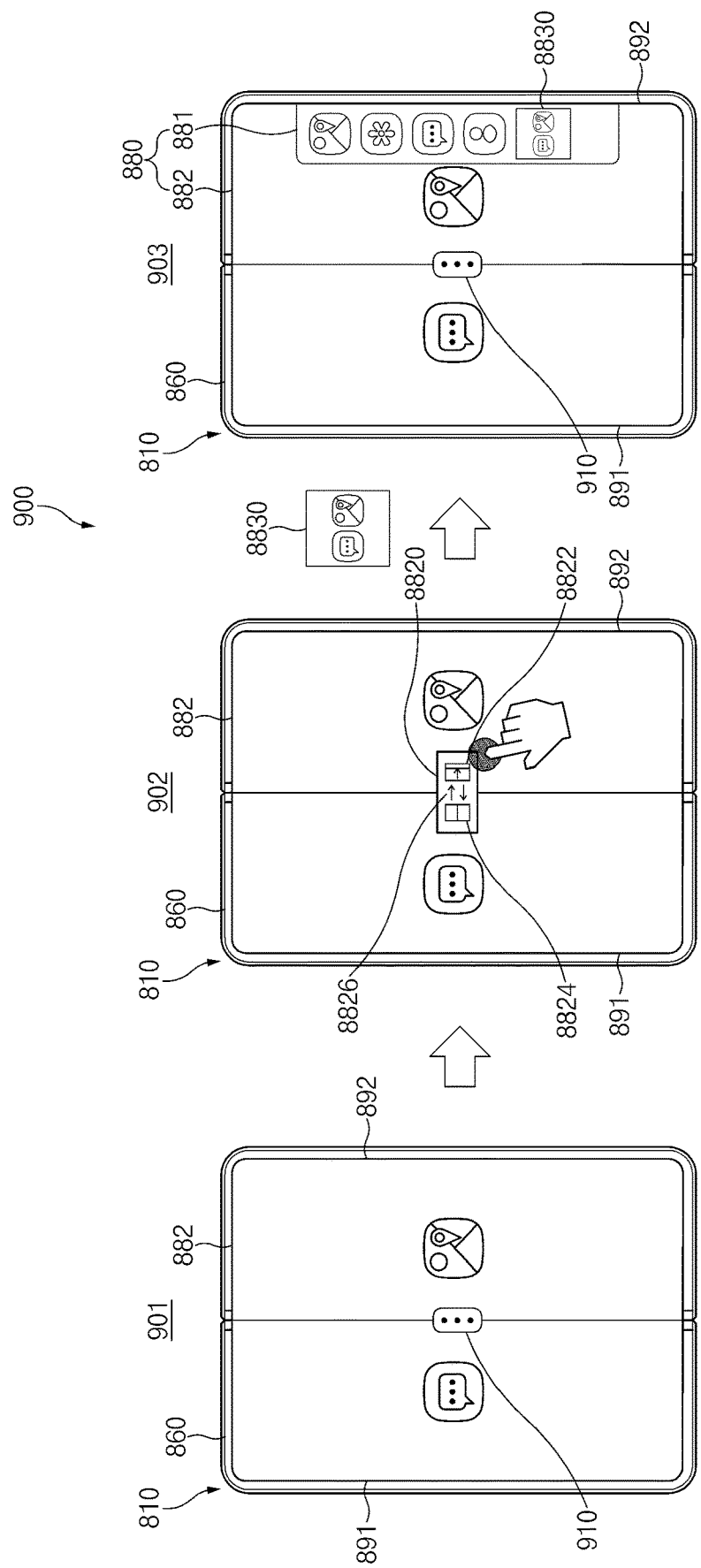
FIGS. 9A, 9B, and 9C are drawings illustrating operations 504 to 507 of FIG. 5 according to various embodiments of the disclosure.
Figure 9B:
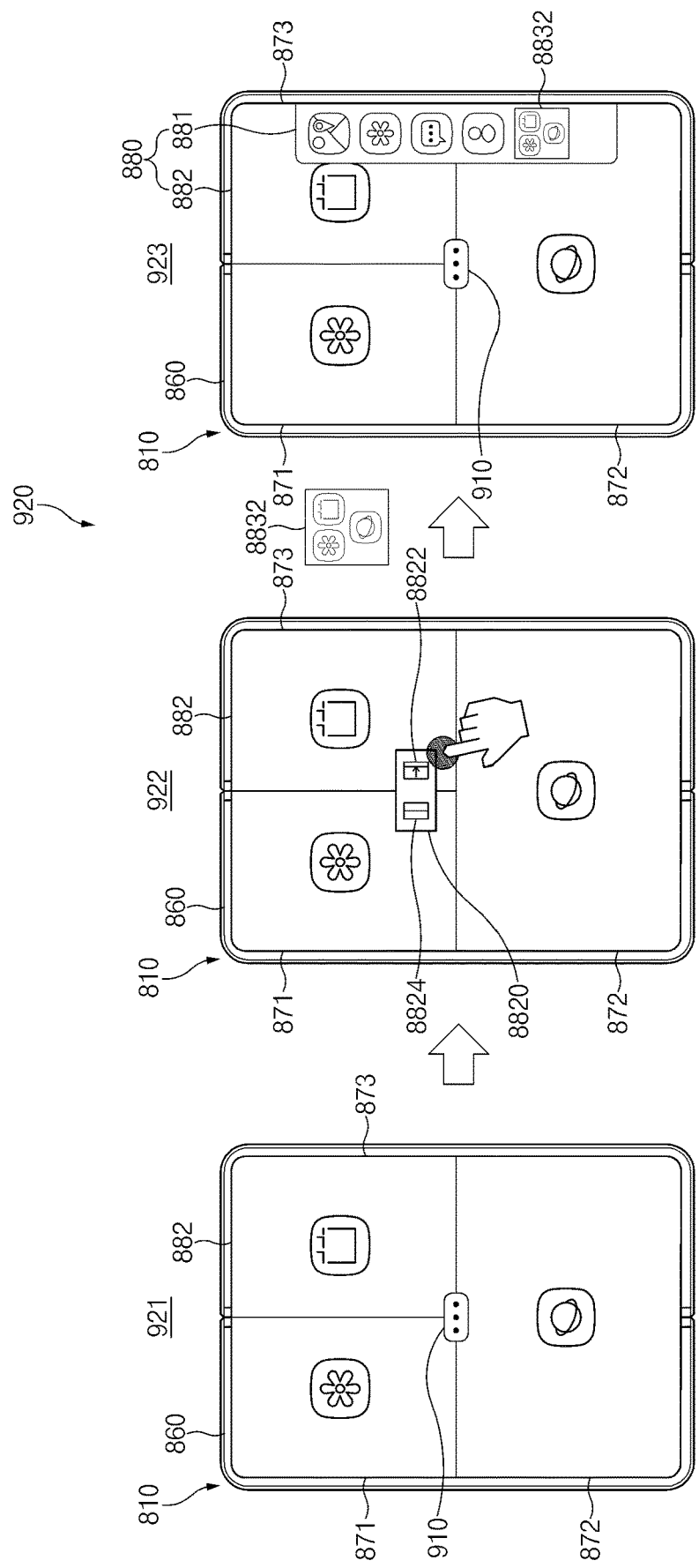
Figure 9C:
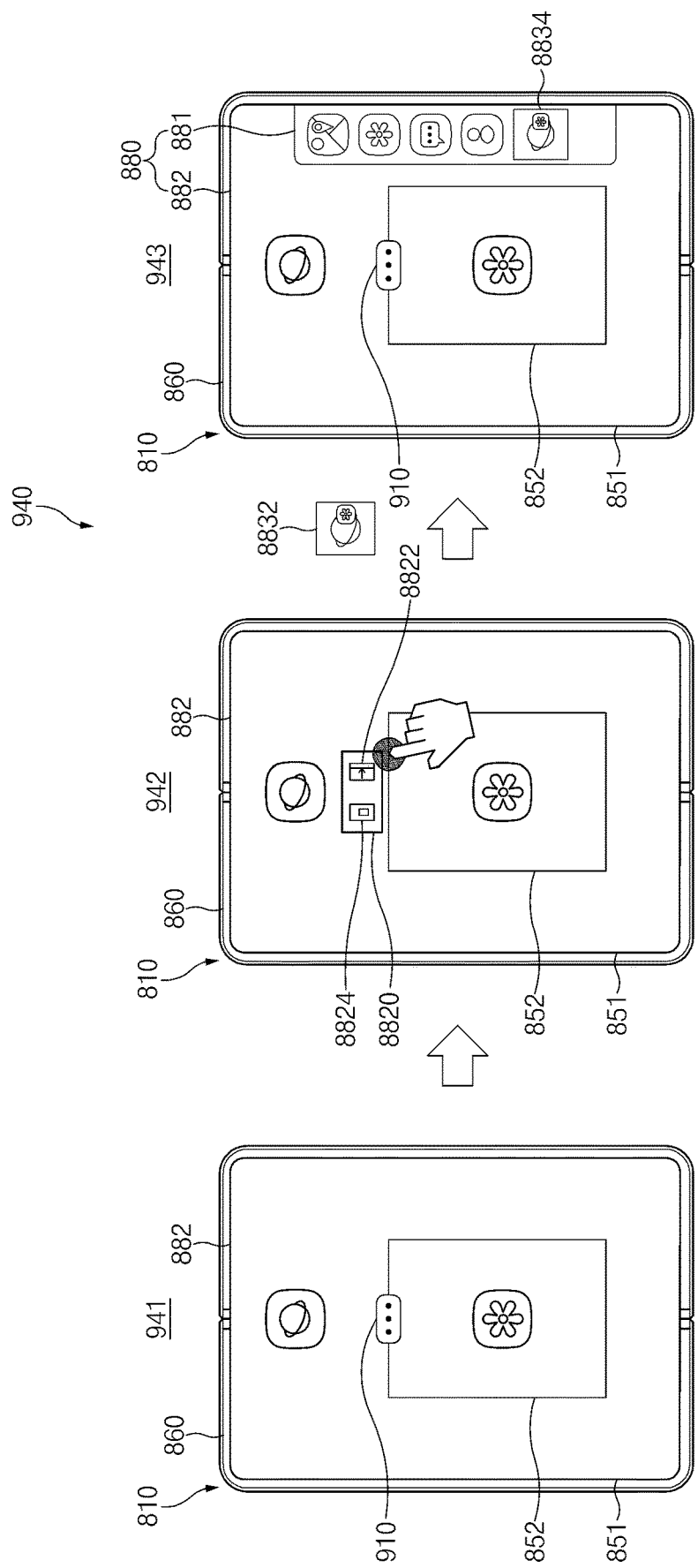

FIGS. 9A, 9B, and 9C are drawings 900, 920, and 940 illustrating operations 504 to 507 of FIG. 5 according to various embodiments of the disclosure. Operations of an electronic device 810 (e.g., an electronic device 201 of FIG. 2), which will be described below, may be performed by a processor (e.g., a processor 230 of FIG. 2) of the electronic device 810.

FIG. 9A is a drawing illustrating an operation performed after a last state (a fourth state 804) of the electronic device 810 shown in FIG. 8A. For example, a first state 901 of FIG. 9A may be the same as the fourth state 804 of FIG. 8A.

Referring to FIG. 9A, in the first state 901, the electronic device 810 may be in a state where a two-split multi-window layout where a first window 891 to which a first application is mapped and a second window 892 to which a second application is mapped are arranged from side to side is determined. For example, the electronic device 810 may display a control user interface (UI) on a bar which splits the first window 891 and the second window 892. According to an embodiment of the disclosure, depending on receiving a user input for selecting the control UI 910, the electronic device 810 may display a graphic user input (GUI) 8820 for changing or storing a multi-window layout on a second area 882. The user input for selecting the control UI 910 may include, for example, a touch gesture input including press or tap.

In a second state 902, the electronic device 810 may display the GUI 8820 on the second area 882. The GUI 8820 may include a second icon 8822 to which an operation where the electronic device 810 stores a multi-window layout displayed on the second area 882 in the electronic device 810 is mapped, a layout change icon 8824 to which an operation of changing the multi-window layout displayed on the second area 882 to another layout within the same number of splits is mapped, and a window mutual change icon 8826 to which an operation of mutually changing locations of the first window 891 and the second window 892 is mapped. According to an embodiment of the disclosure, the electronic device 810 may display the window mutual change icon 8826 in only a two-split multi-window layout arranged up and down and a two-split multi-window layout arranged from side to side. The layout change icon 8824 will be described below with reference to FIG. 10.

Although not illustrated in FIG. 9A, depending on receiving a user input for selecting the application mutual change icon 8826, the electronic device 810 may arrange the first window 891 at a right side of the second area 882 and may arrange the second window 892 at a left side of the second area 882, thus mutually changing the locations of the first window 891 and the second window 892. The user input for selecting the application mutual change icon 8826 may include, for example, a touch gesture input, such as press, or tap.

Depending on receiving a second user input for selecting the second icon 8822, the electronic device 810 may map and store the multi-window layout displayed on the second area 882 to the third icon 8830 in a memory of the electronic device 810. The second user input may be, for example, but is not limited to, a gesture, such as tap, double tap, or press. The second user input may include the other touch inputs, a voice input, and a non-contact input using a pen which is one of input devices (e.g., an input module 150 of FIG. 1) of the electronic device (e.g., hover, an input for pressing a button of the pen, a gesture input using the pen, or the like). Depending on receiving the second user input, the electronic device 810 may generate the third icon 8830 to which the multi-window layout displayed on the second area 882 in the second state 902 is mapped.

Meanwhile, the third icon 8830 described with reference to FIG. 9A may refer to an icon to which the multi-window layout of a first application and a second application, which is displayed on the second area 882 in the second state 922, is mapped, which may be distinguished from a third icon 8832, which will be described below with reference to FIG. 9B and a third icon 8834, which will be described below with reference to FIG. 9C.

The electronic device 810 may determine a shape of the third icon 8830 based on the multi-window layout displayed on the second area 882. The electronic device 810 may generate the third icon 8830 in the shape of arranging an icon indicating the first application mapped to the first window 891 (e.g., a first icon 8810 for running a first application of FIG. 8A) at its left side and arranging an icon indicating the second application mapped to the second window 892 (e.g., a first icon 8812 for running a second application of FIG. 8A) at its right side based on the multi-window layout where the first window 891 and the second window 892 are arranged from side to side.

In a third state 903, the electronic device 810 may display the generated third icon 8830 on the first area 881. The electronic device 810 may set the third icon 8830 to which the multi-window layout of the first application and the second application, which is displayed on the second area 882, is mapped to be displayed on an edge panel area and may configure and display a multi-window layout of the first application and the second application mapped to the third icon 8830 on the second area 882 depending on subsequently receiving a user input for selecting the third icon 8830.

FIG. 9B is a drawing illustrating an operation performed after a last state (a sixth state 826) of the electronic device 810 shown in FIGS. 8B and 8C. For example, a first state 921 of FIG. 9B may be the same as the sixth state 826 of FIG. 8C.

Referring to FIG. 9B, in the first state 921, the electronic device 810 may be a state where a three-split multi-window layout where a first window 871 to which a third application is mapped and a third window 873 to which a fifth application is mapped are arranged from side to side on the top of the second area 882 and where a second window 872 to which the fourth application is mapped is disposed on the bottom of the second area 882 is determined. For example, the electronic device 810 may display a control UI 910 on a bar which splits the first window 871, the second window 872, and the third window 873. According to an embodiment of the disclosure, depending on receiving a user input for selecting the control UI 910, the electronic device 810 may display a GUI 8820 for changing or storing a multi-window layout on the second area 882. The user input for selecting the control UI 910 may include, for example, a touch gesture input including press or tap.

In a second state 922, the electronic device 810 may display the GUI 8820 on the second area 882. The GUI 8820 may include a second icon 8822 and a layout change icon 8824. Because the layout change icon 8824 will be described below with reference to FIG. 10 and because the second icon 8822 was described above with reference to FIG. 9A, a duplicated description will be brief and omitted.

Depending on receiving a second user input for selecting the second icon 8822, the electronic device 810 may map and store the multi-window layout displayed on the second area 882 to the third icon 8832 in a memory of the electronic device 810. Because the second user input was described above with reference to FIG. 9A, a duplicated description will be brief or omitted. Depending on receiving the second user input, the electronic device 810 may generate the third icon 8832 to which the multi-window layout displayed on the second area 882 in the second state 922 is mapped.

The electronic device 810 may determine a shape of the third icon 8832 based on the multi-window layout displayed on the second area 882. The electronic device 810 may generate the third icon 8832 in the shape of arranging an icon indicating the third application mapped to the first window 871 (e.g., a first icon 8814 for running a third application of FIG. 8B) at an upper left side of the third icon 8832, arranging an icon indicating the fifth application mapped to the third window 873 (e.g., a first icon 8818 for running the fifth application of FIG. 8B) at an upper right side of the third icon 8832, and arranging an icon indicating the fourth application mapped to the second window 872 (e.g., a first icon 8816 for running the fourth application of FIG. 8C) on the bottom of the third icon 8832 based on the multi-window layout where the first window 871 and the third window 873 are arranged from side to side on the top of the second area 882 and where the second window 872 is disposed on the bottom of the second area 882.

In a third state 923, the electronic device 810 may display the generated third icon 8832 on the first area 881. The electronic device 810 may set the third icon 8832 to which the multi-window layout of the third application, the fourth application, and the fifth application, which is displayed on the second area 882, is mapped to be displayed on an edge panel area and may configure and display a multi-window layout of the third application, the fourth application, and the fifth application mapped to the third icon 8832 on the second area 882 depending on subsequently receiving a user input for selecting the third icon 8832.

FIG. 9C is a drawing illustrating an operation performed after a last state (a fourth state 804) of the electronic device 810 shown in FIG. 8D. For example, a first state 941 of FIG. 9C may be the same as the fourth state 844 of FIG. 8D.

Referring to FIG. 9C, in the first state 941, the electronic device 810 may be in a state where a two-split multi-window layout disposed as a pop-up screen such that a first window 851 to which the fourth application is mapped is disposed as a full screen on the second area 882 and such that a second window 852 to which the third application is mapped overlaps the first window 851 on the second area 882 is determined. For example, the electronic device 810 may display a control UI 910 on a bar which splits the first window 851 and the second window 852. According to an embodiment of the disclosure, depending on receiving a user input for selecting the control UI 910, the electronic device 810 may display a GUI 8820 for changing or storing a multi-window layout on the second area 882. The user input for selecting the control UI 910 may include, for example, a touch gesture input including press or tap.

In a second state 942, the electronic device 810 may display the GUI 8820 on the second area 882. The GUI 8820 may include a second icon 8822 and a layout change icon 8824. Because the layout change icon 8824 will be described below with reference to FIG. 10 and because the second icon 8822 was described above with reference to FIG. 9A, a duplicated description will be brief and omitted.

Depending on receiving a second user input for selecting the second icon 8822, the electronic device 810 may map and store the multi-window layout displayed on the second area 882 to the third icon 8834 in a memory of the electronic device 810. Because the second user input was described above with reference to FIG. 9A, a duplicated description will be brief or omitted. Depending on receiving the second user input, the electronic device 810 may generate the third icon 8834 to which the multi-window layout displayed on the second area 882 in the second state 942 is mapped.

The electronic device 810 may determine a shape of the third icon 8834 based on the multi-window layout displayed on the second area 882. The electronic device 810 may generate the third icon 8832 in the shape of overlapping and arranging an icon indicating the third application mapped to the second window 852 (e.g., a first icon 8814 for running a third application of FIG. 8D) with an icon indicating the fourth application mapped to the first window 851 (e.g., a first icon 8816 for running a fourth application of FIG. 8D) based on the multi-window layout disposed as the pop-up screen such that the first window 851 is disposed as the full screen on the second area 882 and such that the second window 852 overlaps the first window 851 on the second area 882. The icon indicating the third application in the third icon 8832 may be smaller in size than the icon indicating the fourth application.

In a third state 943, the electronic device 810 may display the generated third icon 8834 on the first area 881. The electronic device 810 may set the third icon 8834 to which the multi-window layout of the fourth application and the third application, which is displayed on the second area 882, is mapped to be displayed on an edge panel area and may configure and display a multi-window layout of the fourth application and the third application mapped to the third icon 8834 on the second area 882 depending on subsequently receiving a user input for selecting the third icon 8834.

Hereinafter, a description will be given of a method for changing a determined multi-window layout before storing a multi-window layout in an electronic device according to an embodiment with reference to FIG. 10.

Figure 10:
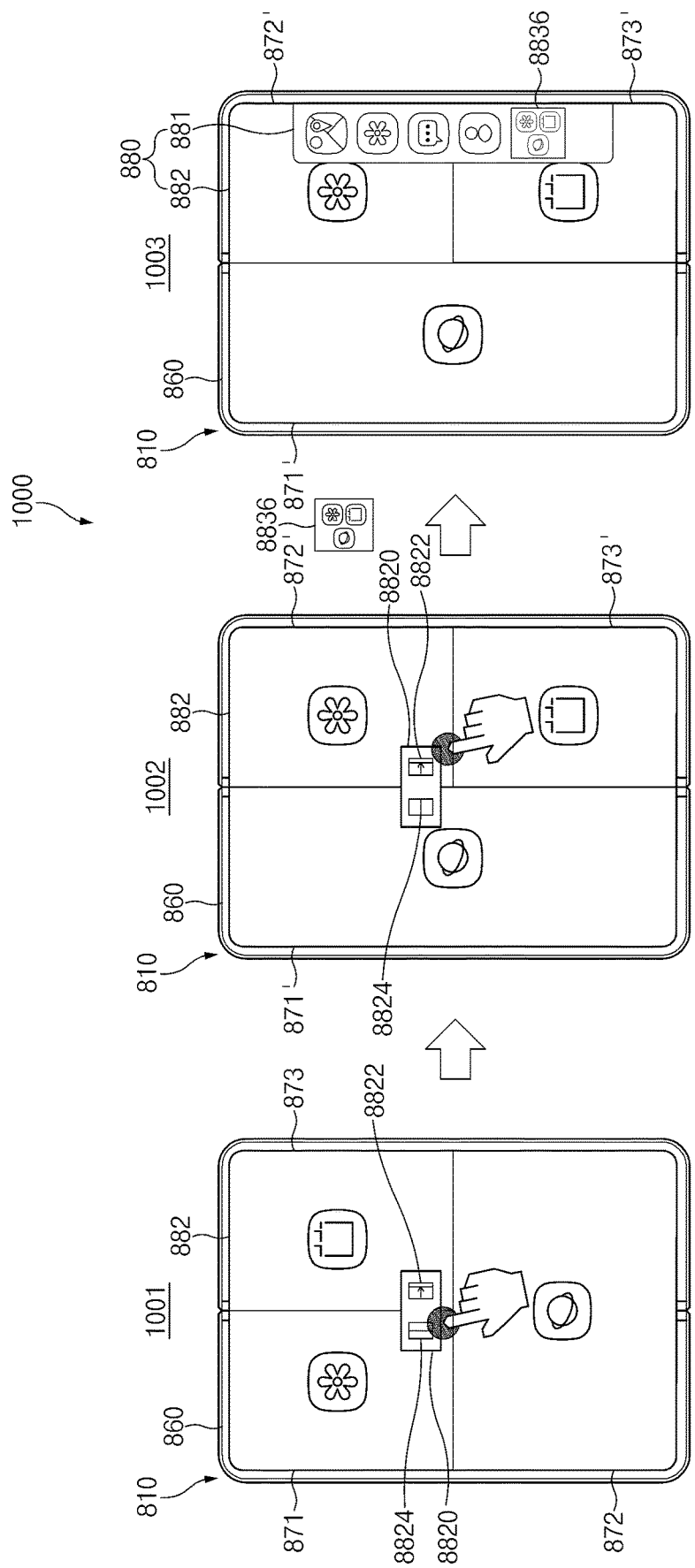
FIG. 10 is a drawing illustrating a method for changing a determined multi-window layout before storing the determined multi-window layout in an electronic device according to an embodiment of the disclosure.

FIG. 10 is a drawing 1000 illustrating a method for changing a determined multi-window layout in an electronic device according to an embodiment of the disclosure. Operations of an electronic device 810 (e.g., an electronic device 201 of FIG. 2), which will be described below, may be performed by a processor (e.g., a processor 230 of FIG. 2) of the electronic device 810.

States of the electronic device 810 shown in FIG. 10 may be states before receiving a second user input for selecting a second icon 8822 in a second state 922 of FIG. 9B.

Referring to FIG. 10, in a first state 1001, the electronic device 810 may display a multi-window layout configured with a first window 871 to which a third application is mapped, a second window 872 to which a fourth application is mapped, and a third window 873 to which a fifth application is mapped on a second area 882. The electronic device 810 may display a GUI 8820 for storing or changing the multi-window layout to which the third application, the fourth application, and the fifth application, which is displayed on the second area 882. The GUI 8820 may include a second icon 8822 to which an operation where the electronic device 810 stores the multi-window layout displayed on the second area 882 in the electronic device 810 is mapped and a layout change icon 8824 to which an operation of changing the multi-window layout displayed on the second area 882 to another layout within the same number of splits is mapped.

Depending on receiving a user input for selecting the layout change icon 8824, the electronic device 810 may change the arrangement of the first window 871, the second window 872, and the third window 873 like the second state 1002.

In the second state 1002, the changed first window 871' may be disposed at a left side of the second area 882, the changed second window 872' may be disposed on the right top of the second area 882, and the changed third window 873' may be disposed on the right bottom of the second area 882. The electronic device 810 may map the third application, the fourth application, and the fifth application to the changed first window 871', the changed second window 872', and the changed third window 873' again. The electronic device 810 may map the fourth application to the changed first window 871', may map the third application to the changed second window 872', and may map the fifth application to the changed third window 873', thus changing the multi-window layout.

According to an embodiment of the disclosure, a three-split multi-window layout displayed on the second area 882 in the first state 1001 may be a three-split multi-window layout of an upper and lower layout base, and a changed three-split multi-window layout displayed on the second area 882 in the second state 1001 may be a three-split multi-window layout of a left and right layout base.

In the second state 1002, depending on receiving a second user input for selecting the second icon 8822, the electronic device 810 may map and store the multi-window layout displayed on the second area 882 to the third icon 8830 in a memory of the electronic device 810. Depending on receiving the second user input, the electronic device 810 may generate a third icon 8836 to which the multi-window layout displayed on the second area 882 in the second state 1002 is mapped.

Meanwhile, the third icon 8830 described with reference to FIG. 10 may refer to an icon to which the multi-window layout of the third application, the fourth application, and the fifth application, which is displayed on the second area 882 in the second state 1002, is mapped, which may be distinguished from the third icon 8832 described with reference to FIG. 9B, because it differs in arrangement structure from the multi-window layout mapped to the third icon 8832 described above with reference to FIG. 9B. It is obvious that the third icon 8830 described with reference to FIG. 9A is distinguished from the third icon 8834 described with reference to FIG. 9C.

Hereinafter, a description will be given of a method for generating an icon to which a multi-window layout is mapped based on a setting menu in an electronic device according to an embodiment with reference to FIG. 11.

Figure 11:
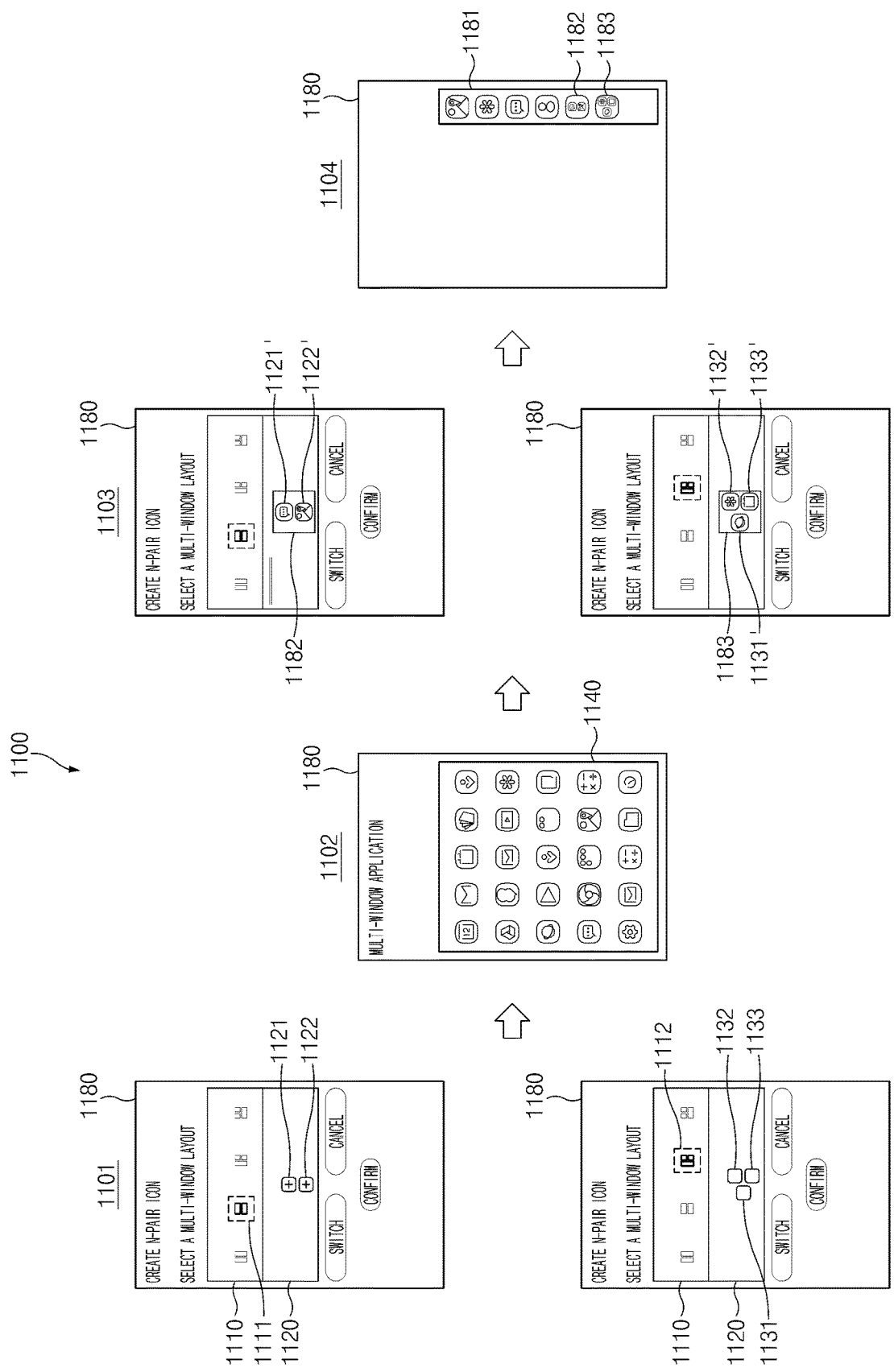
FIG. 11 is a drawing illustrating a method for generating an icon to which a multi-window layout is mapped in an electronic device according to an embodiment of the disclosure.

FIG. 11 is a drawing 1100 for describing a method for generating an icon to which a multi-window layout is mapped in an electronic device according to an embodiment of the disclosure. Operations of an electronic device (e.g., an electronic device 201 of FIG. 2), which will be described below, may be performed by a processor (e.g., a processor 230 of FIG. 2) of the electronic device.

According to an embodiment of the disclosure, as described above with reference to FIGS. 1 to 7, 8A to 8D, 9A to 9C, and 10, the electronic device may determine a multi-window layout based on a user input which is input to a first area (an edge panel area) and may generate and display an icon to which the determined multi-window layout is mapped on the first area.

According to another embodiment of the disclosure, the electronic device may configure a multi-window layout based on a user input through a setting menu of the electronic device, may generate an icon to which the configured multi-window layout is mapped, and may display the generated icon on the first area.

Referring to FIG. 11, a first state 1101 may be a state where the electronic device displays a user interface screen for generating an icon (e.g., an N-pair icon) to which the multi-window layout is mapped on a display area 1180 as the electronic device receives an input for entering the user interface screen for generating the icon (e.g., the N-pair icon) to which the multi-window layout is mapped in the setting menu.

For example, the user interface for generating the icon to which the multi-window layout is mapped may include a first user interface (UI) including a list of one or more multi-window layouts and a second UI 1120 for mapping a plurality of applications to the multi-window layout selected on the first UI 1110. The second UI 1120 may include icons corresponding to a plurality of windows according to the multi-window layout selected on the first UI 1110.

In the first state 1101, the electronic device may receive a user input for selecting a first multi-window layout 1111 through the first UI 1110. Depending on receiving the user input for selecting the first multi-window layout 1111, the electronic device may change a layout of the icons corresponding to the plurality of windows included in the second UI 1120 based on the first multi-window layout 1111. As the first multi-window layout 1111 is a two-split multi-window layout where the plurality of windows are arranged up and down, the electronic device may arrange an icon 1121 corresponding to a first window and an icon 1122 corresponding to a second window up and down.

In the first state 1101, depending on receiving a user input for selecting the icon 1121 corresponding to the first window or the icon 1122 corresponding to the second window, the electronic device may change to a second state 1102.

The second state 1102 may be a state where the electronic device displays a user interface screen including a list 1140 of applications supporting the multi-window mode on the display area 1180. In the second state 1102, the electronic device may receive a user input for selecting an application to be mapped to each of the plurality of applications.

Depending on receiving a user input for selecting a first application in the second state 1102 changed according to receiving the user input for selecting the icon 1121 corresponding to the first window, the electronic device may map the first application to the first window. Depending on receiving a user input for selecting a second application in the second state 1102 changed according to receiving the user input for selecting the icon 1122 corresponding to the second window, the electronic device may map the second application to the second window.

A third state 1103 may be a state where the electronic device displays a screen for generating an N-pair icon where the application is mapped to each of the plurality of windows making up the multi-window layout on the display area 1180, based on a selection input received in the second state 1102.

In the third state 1103, the electronic device may change the icon 1121 corresponding to the first window to an icon 1121' indicating the first application mapped to the first window and may change the icon 1122 corresponding to the second window to an icon 1122' indicating the second application mapped to the second window. The electronic device may generate a first N-pair icon 1182 where the icon 1121' indicating the first application and the icon 1122' indicating the second application mapped to the second window are arranged up and down.

In the third state 1103, depending on receiving a user input for selecting a "switch" button, the electronic device may change the first application to be mapped to the second window and may change the second application to be mapped to the first window and may change locations of the icon 1121' indicating the first application and the icon 1122' indicating the second application.

In the third state 1103, depending on receiving a user input for selecting a "cancel" button, the electronic device may end the display of the user interface screen for generating the N-pair icon.

In the third state 1103, depending on receiving a user input for selecting a "confirm" button, the electronic device may store the generated 1 N-pair icon 1182.

A fourth state 1104 may be a state where the electronic device displays a first area 1181, which is an edge panel area, on the display area 1180. In the fourth state 1104, the electronic device 810 may display the first N-pair icon 1182 on the first area 1181.

Hereinafter, a description will be given of a method for generating an N-pair icon as the electronic device receives an input for selecting a second multi-window layout 1112 where the first window is disposed at its left side in the first state and where the second window and the third window are arranged up and down at its right side.

In the first state 1101, depending on receiving an input for selecting the second multi-window layout 1112, the electronic device may change a layout of the icons corresponding to the plurality of windows included in the second UI 1120 based on the second multi-window layout 1112. As the electronic device is in a three-split multi-window layout where the first window is disposed at its left side and where the second window and the third window are up and down at its right side, it may arrange an icon 1131 corresponding to the first window in its left center and may arrange an icon 1132 corresponding to the second window and an icon 1133 corresponding to the third window up and down at its right side.

In the first state 1101, depending on receiving a user input for selecting the icon 1131 corresponding to the first window, the icon 1133 corresponding to the second window, or the icon 1133 corresponding to the third window in the first state, the electronic device may change to the second state 1102.

Depending on receiving a user input for selecting a third application in the second state 1102 changed according to receiving the user input for selecting the icon 1131 corresponding to the first window, the electronic device may map the third application to the first window. Depending on receiving a user input for selecting a fourth application in the second state 1102 changed according to receiving the user input for selecting the icon 1132 corresponding to the second window, the electronic device may map the fourth application to the second window. Depending on receiving a user input for selecting a fifth application in the second state 1102 changed according to receiving the user input for selecting the icon 1133 corresponding to the third window, the electronic device may map the fifth application to the third window.

In the third state 1103, the electronic device may change the icon 1131 corresponding to the first window to an icon 1131' indicating the third application mapped to the first window, may change the icon 1132 corresponding to the second window to an icon 1132' indicating the fourth application mapped to the second window, and may change the icon 1133 corresponding to the third window to an icon 1133' indicating the fifth application mapped to the third window. The electronic device may generate a second N-pair icon 1183 where the icon 1131' indicating the third application is disposed in a left center and where the icon 1132' indicating the fourth application mapped to the second window and the icon 1133' indicating the fifth application mapped to the third window are arranged up and down at its right side.

In the third state 1103, depending on receiving a user input for selecting a "switch" button, the electronic device may change a window to which the third application, the fourth application, and the fifth application are mapped and may change locations of the icon 1131' indicating the third application, the icon 1132' indicating the fourth application, and the icon 1133' indicating the fifth application based on a location of the changed mapped window.

In the third state 1103, depending on receiving a user input for selecting a "confirm" button, the electronic device may store the generated 2 N-pair icon 1183.

In the fourth state 1104, the electronic device 810 may display the second N-pair icon 1183 on the first area 1181.

Hereinafter, a description will be given of a method for executing an icon to which a multi-window layout is mapped in an electronic device according to an embodiment with reference to FIGS. 12 and 13.

Figure 12:
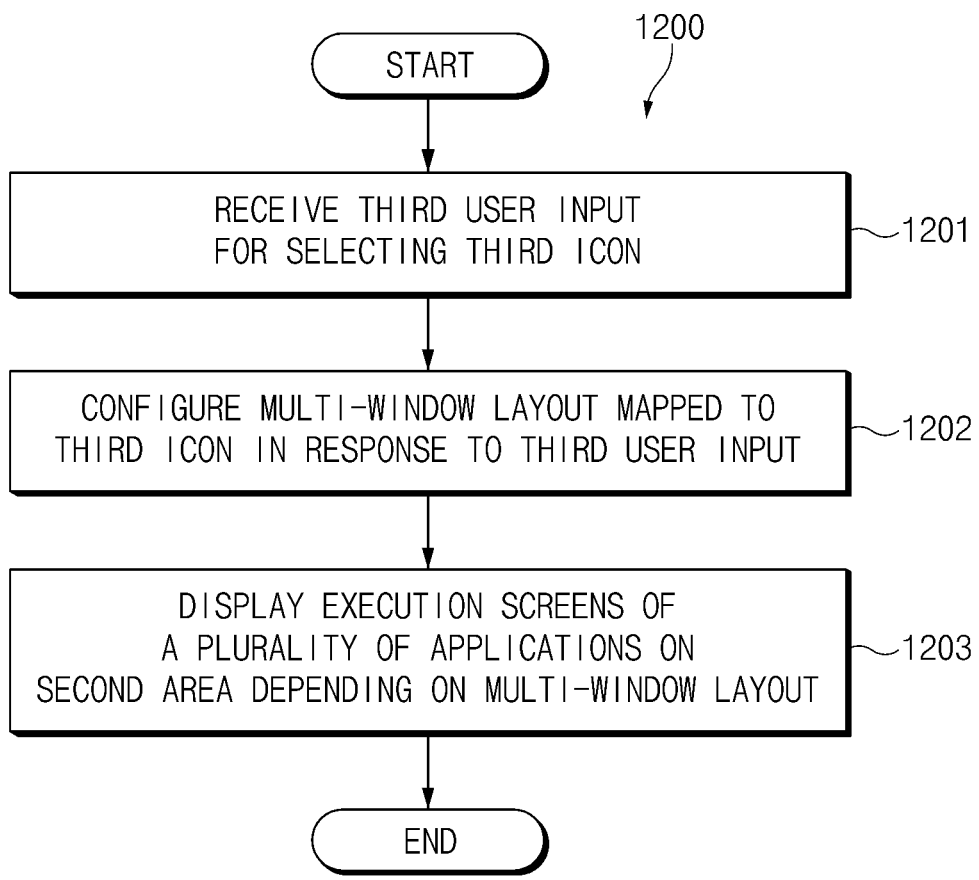
FIG. 12 is a flowchart illustrating an operation of an electronic device according to an embodiment of the disclosure.

FIG. 12 is a flowchart 1200 illustrating an operation of an electronic device according to an embodiment of the disclosure.

Figure 13:
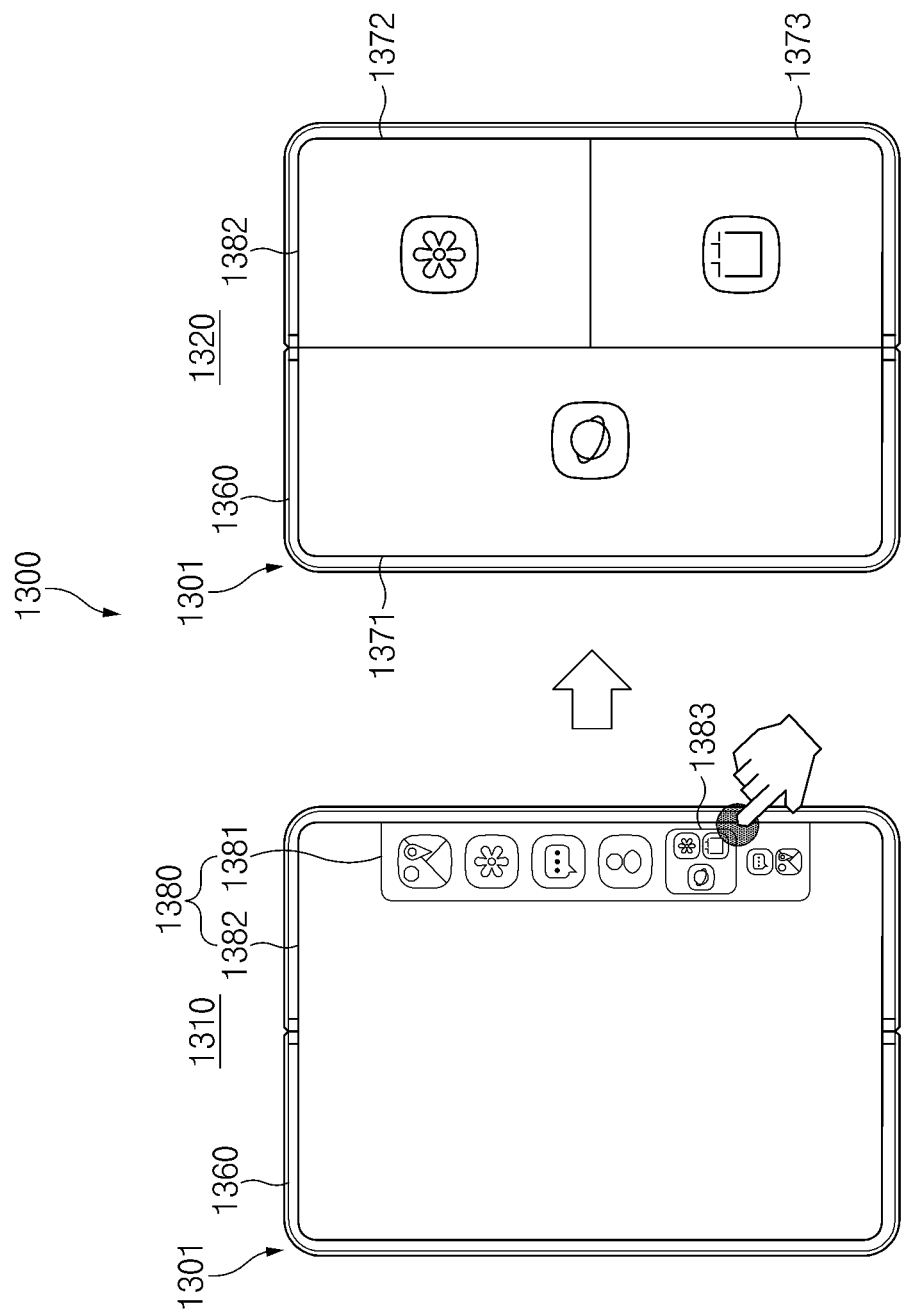
FIG. 13 is a drawing illustrating operations shown in FIG. 12 according to an embodiment of the disclosure.

FIG. 13 is a drawing 1300 illustrating operations shown in FIG. 12 according to an embodiment of the disclosure. Operations of an electronic device 1301 (e.g., an electronic device 201 of FIG. 2), which will be described below, may be performed by a processor (e.g., a processor 230 of FIG. 2) of the electronic device 1301.

Referring to FIG. 13, the electronic device 1301 according to an embodiment may include a display 1360 and may display content on a display area 1380 of the display 1360. The display area 1380 may include a first area 1381, which is an edge panel area, and a second area 1382, which is main area on which content is displayed.

In a first state 1310, the electronic device 1301 may receive a third user input for selecting a third icon 1383 displayed on the first area 1181 (operation 1201).

According to an embodiment of the disclosure, the third icon 1383 may be an icon to which a multi-window layout is mapped. For example, the third icon 1383 may be referred to as an N-pair icon. According to an embodiment of the disclosure, the third icon 1383 may include an icon indicating a plurality of applications to which the multi-window layout is mapped. For example, the third icon 1383 may include a first application (e.g., an Internet application), a second application (e.g., a gallery application), and a third application (e.g., a calendar application). According to an embodiment of the disclosure, the third icon 1383 may be displayed in a form corresponding to an arrangement structure of the multi-window layout mapped to the third icon 1383. For example, the third icon 1383 may be displayed in a form where the first application is disposed at its left side and where the second application and the third application are arranged up and down at its right side.

The third user input may include at least one of, for example, a touch input, such as tap, double tap, press, or drag and drop for selecting and dragging the third icon 1183 from the first area 1381 to the second area 1182, a voice input, or a non-contact input using a pen which is one of input devices (e.g., an input module 150 of FIG. 1) of the electronic device (e.g., hover, an input for pressing a button of the pen, a gesture input using the pen, or the like).

In the first state 1310, depending on receiving a third user input for selecting the third icon 1383, the electronic device 1301 may obtain pieces of application feature information of the plurality of applications mapped to the third icon 1383 based on the icon indicating the plurality of applications included in the third icon 1383. According to an embodiment of the disclosure, the pieces of application feature information may include whether the applications are installed and whether the applications support a multi-window mode.

According to an embodiment of the disclosure, when the applications are not installed or do not support the multi-window mode, because the electronic device 1301 is unable to configure a multi-window layout including a window to which the corresponding application is mapped, it may determine whether each of the plurality of applications mapped to the third icon 1383 is installed and supports the multi-window mode before configuring the multi-window layout mapped to the third icon 1383.

In the first state 1310, the electronic device 1301 may configure the multi-window layout mapped to the third icon 1383 in response to the third user input for selecting the third icon 1383 (operation 1202).

According to an embodiment of the disclosure, when some of the plurality of applications mapped to the third icon 1383 are not installed in the electronic device 1301 or do not support the multi-window mode, the electronic device 1301 may reconfigure the multi-window layout mapped to the third icon 1383 as a layout for at least one application which is installed in the electronic device 1301 and supports the multi-window mode.

For example, when the first application (e.g., the Internet application) among the plurality of applications mapped to the third icon 1383 is not installed in the electronic device 1301 and does not support the multi-window mode and when the second application (e.g., the gallery application) and the third application (e.g., the calendar application) are installed in the electronic device 1301 and support the multi-window mode, the electronic device 1301 may reconfigure the multi-window layout mapped to the third icon 1383 as a layout for the second application (e.g., the gallery application) and the third application (e.g., the calendar application). For example, the electronic device 1301 may reconfigure the multi-window layout mapped to the third icon 1383 as a layout where a window to which the second application is mapped is disposed on the top and where a window to which the third application is mapped is disposed on the bottom.

According to an embodiment of the disclosure, when all the plurality of applications mapped to the third icon 1383 are not installed in the electronic device 1301 or do not support the multi-window mode, the electronic device 1301 may change settings not to display the third icon 1383 on the first area 1381.

According to an embodiment of the disclosure, the electronic device 1301 may configure a multi-window layout in response to the multi-window layout mapped to the third icon 1383 or the multi-window layout reconfigured based on or the pieces of application feature information of the plurality of applications mapped to the third icon 1383. For example, the multi-window layout mapped to the third icon 1383 may be a layout where a first window 1371 to which the first application (e.g., the Internet application) is mapped is disposed at a left side of the second area 1382 and where a second window 1372 to which the second application (e.g., the gallery application) is mapped and a third window 1373 to which the third application (e.g., the calendar application) is mapped are arranged up and down at the right side of the second area 1382.

According to an embodiment of the disclosure, the electronic device 1301 may configure a multi-window layout where the first window 1371 is disposed at the left side of the second area 1382 and where the second window 1372 and the third window 1373 are arranged up and down at the right side of the second area 1382 based on the multi-window layout mapped to the third icon.

In a second state, the electronic device 1301 may display execution screens of the plurality of applications on the second area 1382 depending on the configured multi-window layout. For example, the electronic device 1301 may display an execution screen of the first application (e.g., the Internet application) on the first window 1371, may display an execution screen of the second application (e.g., the gallery application) on the second window 1372, and may display an execution screen of the third application (e.g., the calendar application) on the third window 1373.

In operation 1202, the electronic device 1301 according to an embodiment may configure the multi-window layout mapped to the third icon 1383 based on the display feature information. As described above, the display feature information may include, for example, an enabled display and information, such as resolution, a size, or an aspect ratio of the enabled display. For example, when the display 1360 of the electronic device 1301 is a foldable display or a rollable display, the enabled display 1360 may vary with the state of the electronic device 1301 or the display 1360 may vary in size with the state of the electronic device 1301. Thus, the electronic device 1301 may fail to execute the third icon 1383 or should be able to reconfigure the multi-window layout mapped to the third icon 1383. According to an embodiment of the disclosure, the electronic device 1301 may change an enable state of the third icon 1383 or may change a shape of the third icon 1383, based on the display feature information.

Hereinafter, a description will be given of a method for changing the display of an icon to which a multi-window layout is mapped based on display feature information in an electronic device according to various embodiments with reference to FIGS. 14A and 14B.

Figure 14A:
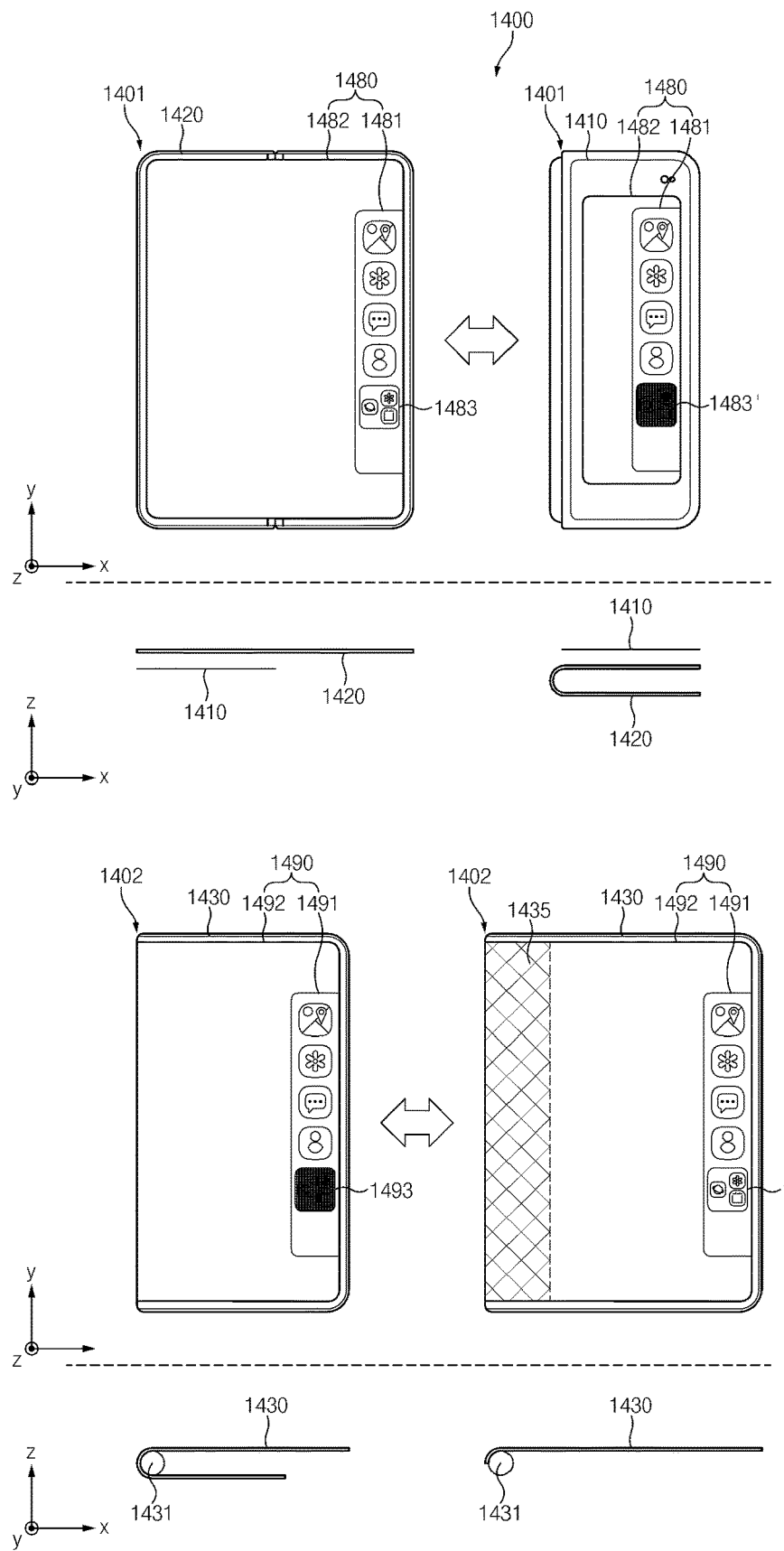
FIG. 14A is a drawing illustrating a method for changing an enable state of an icon to which a multi-window layout is mapped in an electronic device according to an embodiment of the disclosure.

FIG. 14A is a drawing 1400 illustrating a method for changing an enable state of an icon to which a multi-window layout is mapped in an electronic device according to an embodiment of the disclosure. FIG. 14B is a drawing 1450 illustrating a method for changing a shape of an icon to which a multi-window layout is mapped in an electronic device according to an embodiment of the disclosure.

Operations of an electronic device 1401 (e.g., an electronic device 201 of FIG. 2), which will be described below, may be performed by a processor (e.g., a processor 230 of FIG. 2) of the electronic device 1401. Operations of an electronic device 1402 (e.g., the electronic device 201 of FIG. 2), which will be described below, may be performed by a processor (e.g., the processor 230 of FIG. 2) of the electronic device 1402.

Figure 14B:
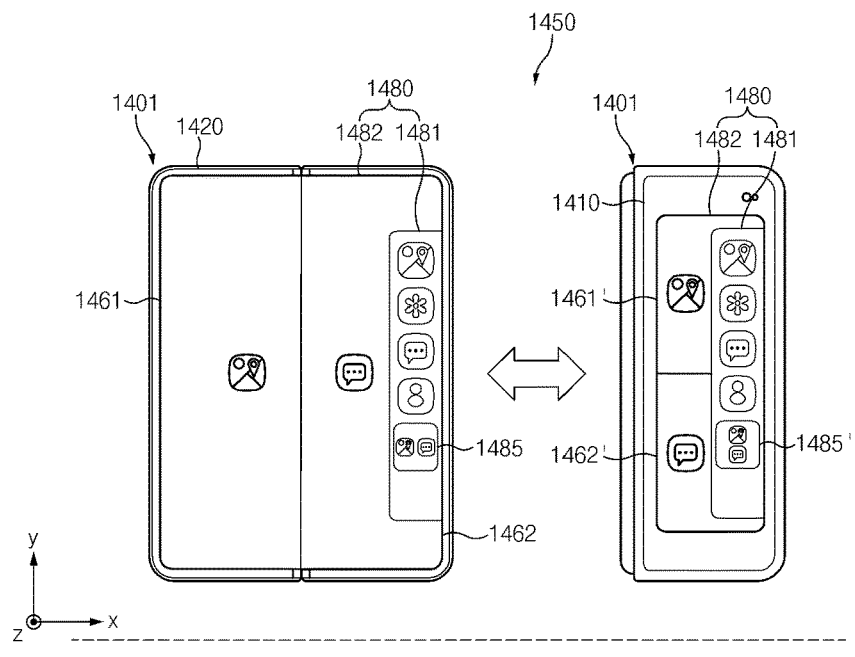
FIG. 14B is a drawing illustrating a method for changing a shape of an icon to which a multi-window layout is mapped in an electronic device according to an embodiment of the disclosure.
Figure 14B:
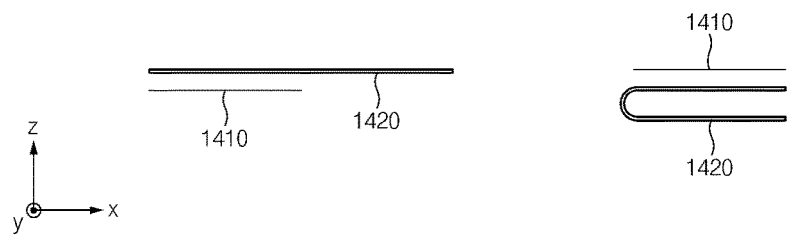
Figure 14B:
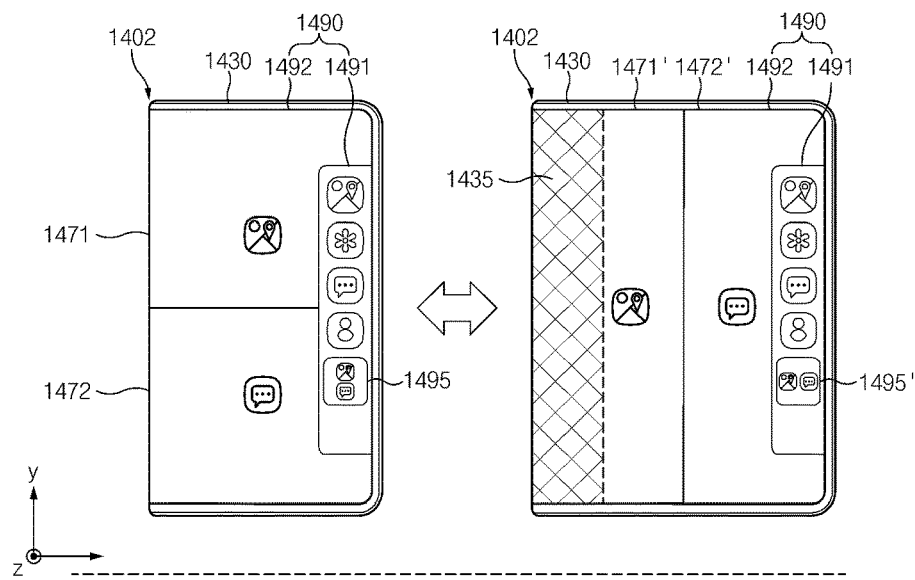
Figure 14B:

Referring to FIGS. 14A and 14B, the electronic device 1401 may include a foldable display. The electronic device 1401 may include a first display 1410 and a second display 1420. The first display 1410 and the second display 1420 may be arranged on the electronic device 1401 to expose display areas in opposite directions. According to an embodiment of the disclosure, the second display 1420 may be a foldable display.

According to an embodiment of the disclosure, the electronic device 1401 may be in an unfolding state (or an unfolded state) as shown at the left side and may mutually change to a folding state (or a folded state) as shown at the right side. The electronic device 1401 may display content on a display area of the first display 1410 in the folding state and may display the content on a display area of the second display 1420 in the unfolding state.

According to an embodiment of the disclosure, the electronic device 1401 may determine that the first display 1410 is enabled, as it is identified that the electronic device 1401 is in the folding state by a sensor (e.g., a sensor 210 of FIG. 2), and may determine that the second display 1420 is enabled, as it is identified that the electronic device 1401 is in the unfolding state by the sensor. According to an embodiment of the disclosure, the electronic device 1401 may obtain information of whether the enabled display is the first display 1410 or the second display 1420.

According to an embodiment of the disclosure, the electronic device 1401 may obtain size or aspect ratio information of the first display 1410 in the folding state and may obtain size or aspect ratio information of the second display 1420 in the unfolding state.

According to an embodiment of the disclosure, the second display 1420 may be greater in size than the first display 1410. According to an embodiment of the disclosure, the aspect ratio (e.g., landscape/portrait) of the first display 1420 may be greater than the aspect ratio (e.g., landscape/portrait) of the first display 1410.

Referring to FIGS. 14A and 14B, the electronic device 1402 may include a rollable (slidable) display 1430. According to an embodiment of the disclosure, the electronic device 1402 may be in a rolling in state (or a sliding in state) where at least a part of the rollable display 1430 is wound on a roll 1431 as shown at the left side or may mutually change to a rolling out state (or a sliding out state) where the at least a part of the rollable display 1430, which is wound on the roll 1431, is unwound from the roll 1431 as shown at the right side. The electronic device 1402 may display content on a default display area of the rollable display 1430 in the rolling in state and may display the content on the default display area and an added display area 1435 of the rollable display 1430 in the rolling out state.

According to an embodiment of the disclosure, the electronic device 1402 may determine that the display area of the rollable display 1430 as the default display area, as it is identified that the electronic device 1402 is in the rolling in state by the sensor, and may determine that the display area of the rollable display 1430 includes the default display area and the added display area 1435, as it is identified that the electronic device 1402 is in the rolling out state by the sensor. According to an embodiment of the disclosure, the electronic device 1402 may obtain information of whether there is the added display area 1435 of the rollable display 1430.

According to an embodiment of the disclosure, the electronic device 1402 may obtain size or aspect ratio information of the default display area in the rolling in state and may obtain size or aspect ratio information of the default display area and the added display area in the rolling out state.

According to an embodiment of the disclosure, as the added display area 1435 is present, a size of the display area 1490 may be expanded. According to an embodiment of the disclosure, as the added display area 1435 is present, the aspect ratio (e.g., landscape/portrait) may increase.

According to an embodiment of the disclosure, as the enabled display increases in size or the display area is expanded in size, the electronic device (e.g., the electronic device 1401 or the electronic device 1402) may facilitate a multi-window layout including more windows. According an embodiment of the disclosure, as the enabled display decreases in size or the display area is reduced in size, the electronic device may decrease the maximum number of splits of the multi-window layout capable of being displayed. For example, the electronic device may display all of a two-split multi-window layout, a three-split multi-window layout, and a four-split multi-window layout, when the enabled display or the display area has a relatively large size, but may display only the two-split multi-window layout, when the enabled display or the display area has a relatively small size.

According to an embodiment of the disclosure, the electronic device (e.g., the electronic device 1401 or the electronic device 1402) may change the display of the third icon to which the multi-window layout displayed on the first area is mapped based on the display feature information. For example, when the size of the enabled display or the size of the display area is a size incapable of displaying the multi-window layout mapped to the third icon, the electronic device may disable and display the third icon. On the other hand, when the size of the enabled display or the size of the display area is a size capable of displaying the multi-window layout mapped to the third icon, the electronic device may release the disable display of the third icon.

Referring to FIG. 14A, when the second display 1420 is enabled in the unfolded state, the electronic device 1401 may display a third icon 1483 in an enable state, to which a three-split multi-window layout displayed on the first area 1481 is mapped. When the first display 1410 which is smaller in size that the second display 1420 is enabled as the state of the electronic device 1401 changes to from an unfolded state to a folded state, the electronic device 1401 may disable and display the third icon 1483 in the enable state, to which the three-split multi-window layout is mapped. In the folded state, the electronic device 1401 may display a third icon 1483' in a disable state. When the second display 1420 which is larger in size that the first display 1410 is enabled as the state of the electronic device 1401 changes from the folded state to the unfolded state, the electronic device 1401 may release the disable state of the third icon 1483' in the disable state. In the unfolded state, the electronic device 1401 may display the third icon 1483 in the enable state.

Referring to FIG. 14A, when the size of the display area 1490 of the rollable display 1430 is a size of the default display area in the rolling in state, the electronic device 1402 may display a third icon 1493 in a disable state, to which the three-split multi-window layout is mapped. When the size of the display area 1490 of the rollable display 1430 is expanded to a size including the default display area and an added display area 1435 as the state of the electronic device 1402 changes from the rolling in state to a rolling out state, the electronic device 1402 may release the disable state of the third icon 1493 in the disable state. In the rolling out state, the electronic device 1402 may display a third icon 1493' in the enable state. When the size of the display area 1490 of the rollable display 1430 is reduced as the state of the electronic device 1402 changes from the rolling out state to the rolling in state, the electronic device 1402 may disable and display the third icon 1493' in the enable state. In the rolling in state, the electronic device 1402 may display the third icon 1493 in the disable state.

According to an embodiment of the disclosure, the electronic device (e.g., the electronic device 1401 or the electronic device 1402) may differently provide arrangement of the same number of splits of multi-window layout depending on an aspect ratio of the enabled display or an aspect ratio of the display area. For example, the aspect ratio (e.g., landscape/portrait) of the enabled display or the aspect ratio (e.g., landscape/portrait) of the display area increases, the electronic device (e.g., the electronic device 1401 or the electronic device 1402) may provide a two-split multi-window layout as only left and right arrangement.

According to an embodiment of the disclosure, in executing the third icon to which the multi-window layout displayed on the first area is mapped based on the display feature information, the electronic device (e.g., the electronic device 1401 or the electronic device 1402) may reconfigure the multi-window layout mapped to the third icon based on the display feature information. For example, when the aspect ratio (e.g., landscape/portrait) of the enabled display or the aspect ratio (e.g., landscape/portrait) of the display area increases, the electronic device may reconfigure a two-split multi-window layout of top and bottom arrangement, which is mapped to the third icon, as left and right arrangement. On the other hand, when the aspect ratio (e.g., landscape/portrait) of the enabled display or the aspect ratio (e.g., landscape/portrait) of the display area decreases, the electronic device may reconfigure a two-split multi-window layout of left and right arrangement, which is mapped to the third icon, as top and bottom arrangement. According to an embodiment of the disclosure, the electronic device (e.g., the electronic device 1401 or the electronic device 1402) may reconfigure the multi-window layout mapped at the time of the generation of the third icon based on the display feature information when executing the third icon and may display the reconfigured multi-window layout on the second area.

As described above, the electronic device (e.g., the electronic device 1401 or the electronic device 1402) may determine a shape of the third icon based on the multi-window layout mapped to the third icon. The electronic device may combine each of icons indicating the plurality of applications mapped to the third in the form of being arranged to correspond to the multi-window layout mapped to the third icon to generate the third icon.

According to an embodiment of the disclosure, when the multi-window layout mapped to the third icon is reconfigured based on the display feature information, the electronic device (e.g., the electronic device 1401 or the electronic device 1402) may change the shape of the third icon displayed on the first area 1481. For example, when the reconfigured multi-window layout has the top and bottom arrangement, the electronic device may change the shape of the third icon to a shape of arranging each of the icons indicating the plurality of applications mapped to the third icon up and down. For another example, when the reconfigured multi-window layout has the left and right arrangement, the electronic device may change the shape of the third icon to a shape of arranging each of the icons indicating the plurality of applications mapped to the third icon from side to side.

Referring to FIG. 14B, when the second display 1420 is enabled in the unfolded state, the electronic device 1401 may display a third icon 1485 to which a two-split multi-window layout in left and right arrangement is mapped, which is displayed on the first area 1481. When the first display 1410 which is smaller in aspect ratio (e.g., landscape/portrait) than the second display 1420 is enabled as the state of the electronic device 1401 changes from the unfolded state to the folded state, the electronic device 1401 may change and display the third icon 1484 to which the two-split multi-window layout in left and right arrangement is mapped to top and bottom arrangement. In the folded state, the electronic device 1401 may display a third icon 1485' in top and bottom arrangement. When the second display 1420 which is larger in aspect ratio (e.g., landscape/portrait) than the first display 1410 is enabled as the state of the electronic device 1401 changes from the folded state to the unfolded state, the electronic device 1401 may change and display the third icon 1485' in the top and bottom arrangement to left and right arrangement. In the unfolded state, the electronic device 1401 may display a third icon 1485 in left and right arrangement.

When the second display 1420 is enabled in the unfolded state, the electronic device 1401 may arrange and display a first window 1461 and a second window 1462 from side to side upon receiving a user input for selecting the third icon 1485 in the left and right arrangement, which is displayed on the first area 1481. As the third icon 1485 in the left and right arrangement includes an icon indicating the first application at a right side and includes an icon indicating the second application at a right side, the electronic device 1401 may display an execution screen of the first application on the first window 1461 and may display an execution screen of the second application on the second window 1462.

As the electronic device 1401 changes from the unfolded state to the folded state, the multi-window layout in the left and right arrangement, which is mapped to the third icon 1485 in the left and right arrangement, may be reconfigured as top and bottom arrangement. The electronic device 1401 may display an execution screen of the first application on a first window 1461' reconfigured according to the reconfigured multi-window layout and may display an execution screen of the second application on a second window 1462' reconfigured according to the reconfigured multi-window layout.

The method for displaying the multi-window layout on the second area 1482 when the electronic device 1401 changes from the unfolded state to the folded state is described as an example in the above-mentioned embodiment. However, the above-mentioned method may be applied in the same or similar manner even when the electronic device 1401 changes from the folded state to the unfolded state.

Referring to FIG. 14B, when the aspect ratio (e.g., landscape/portrait) of the display area 1490 of the rollable display 1430 is an aspect ratio (e.g., landscape/portrait) of the default display area 1490 in the rolling in state, the electronic device 1402 may display a third icon 1495 in top and bottom arrangement, to which the two-split multi-window layout is mapped. When the aspect ratio (e.g., landscape/portrait) of the display area 1490 of the rollable display 1430 increases due to an added display area 1435 as the state of the electronic device 1402 changes from the rolling in state to the rolling out state, the electronic device 1402 may change and display the third icon 1495 in the top and bottom arrangement to left and right arrangement. In the rolling out state, the electronic device 1402 may display a third icon 1495' in the left and right arrangement. When the aspect ratio (e.g., landscape/portrait) of the display area 1490 of the rollable display 1430 decreases as the state of the electronic device 1402 changes from the rolling out state to the rolling in state, the electronic device 1402 may change and display the third icon 1495' in the left and right arrangement to top and bottom arrangement. In the rolling in state, the electronic device 1402 may display the third icon 1495 in the top and bottom arrangement.

When the aspect ratio (e.g., landscape/portrait) of the display area 1490 of the rollable display 1430 is an aspect ratio (e.g., landscape/portrait) of the default display area 1490 in the rolling in state, the electronic device 1402 may arrange and display a first window 1471 and a second window 1472 up and down on the second area 1492 depending on receiving a user input for selecting the third icon 1495 in the top and bottom arrangement, which is displayed on the first area 1491. As the third icon 1495 in the top and bottom arrangement includes an icon indicating the first application on the top and includes an icon indicating the second application on the bottom, the electronic device 1402 may display an execution screen of the first application on the first window 1471 and may display an execution screen of the second application on the second window 1472.

As the electronic device 1402 changes from the rolling in state to the rolling out state, the multi-window layout in the top and bottom arrangement, which is mapped to the third icon 1495 in the top and bottom arrangement, may be reconfigured as left and right arrangement. The electronic device 1402 may display an execution screen of the first application on a first window 1471' reconfigured according to the reconfigured multi-window layout and may display an execution screen of the second application on a second window 1472' reconfigured according to the reconfigured multi-window layout.

The method for displaying the multi-window layout on the second area 1492 when the electronic device 1402 changes from the rolling in state to the rolling out state is described as an example in the above-mentioned embodiment. However, the above-mentioned method may be applied in the same or similar manner even when the electronic device 1402 changes from the rolling out state to the rolling in state.

According to an embodiment disclosed in the disclosure, an electronic device (e.g., an electronic device 101 of FIG. 1, an electronic device 201 of FIG. 2, an electronic device 601 of FIG. 6, an electronic device 602 of FIG. 6, an electronic device 701 of FIG. 7, an electronic device 702 of FIG. 7, an electronic device 810 of FIGS. 8A to 8D, 9A to 9C, and 10, an electronic device 1301 of FIG. 13, an electronic device 1401 of FIGS. 14A and 14B, or an electronic device 1402 of FIGS. 14A and 14B) may include a sensor (e.g., a sensor module 176 of FIG. 1 or a sensor 210 of FIG. 2), a display (e.g., a display module 160 of FIG. 1, a display 220 of FIG. 2, a first display 610 of FIG. 6, a second display 620 of FIG. 6, a rollable display 630 of FIG. 6, a display 710 of FIG. 7, a display 720 of FIG. 7, a display 860 of FIGS. 8A to 8D, 9A to 9C, and 10, a display 1360 of FIG. 13, a second display 1420 of FIGS. 14A and 14B, a first display 1420 of FIGS. 14A and 14B, or a rollable display 1430 of FIGS. 14A and 14B), at least one processor (e.g., a processor 120 of FIG. 1 or a processor 230 of FIG. 2), and a memory (e.g., a memory 130 of FIG. 1 or a memory 240 of FIG. 2) operatively connected with the at least one processor. The memory may store one or more instructions, when executed, causing the at least one processor to obtain display feature information of the display based on a state of the electronic device, which is identified by the sensor, receive a first input for selecting a first icon (e.g., a first icon 8810, 8812, 8814, 8816, or 8818) for running an application, which is displayed on a first area (e.g., a first area 881 of FIGS. 8A to 8D, 9A to 9C, and 10, a first area 1181 of FIG. 11, a first area 1381 of FIG. 13, a first area 1481 of FIGS. 14A and 14B, or a first area 1491 of FIGS. 14A and 14B) of a display area of the display, determine a multi-window layout displaying execution screens of a plurality of applications in response to the first user input, based on the display feature information, display the determined multi-window layout on a second area (e.g., a first area 882 of FIGS. 8A to 8D, 9A to 9C, and 10, a first area 1182 of FIG. 11, a first area 1382 of FIG. 13, a first area 1482 of FIGS. 14A and 14B, or a first area 1492 of FIGS. 14A and 14B) of the display, display a second icon (e.g., a second icon 8822 of FIGS. 9A to 9C, and 10) to which an operation of storing the displayed multi-window layout is mapped, and store the displayed multi-window layout, in response to receiving a second user input for selecting the second icon and generate and display a third icon (e.g., a third icon 8830, 8832, 8834, or 8836 of FIGS. 9A to 9C, and 10, a first N-pair icon 1182 of FIG. 11, a second N-pair icon 1183 of FIG. 11, a third icon 1383 of FIG. 13, or a third icon 1483, 1483', 1493, 1493', 1485, 1485', 1495, or 1495' of FIGS. 14A and 14B) to which the multi-window layout is mapped on the first area.

According to an embodiment disclosed in the disclosure, the third icon may include a plurality of first icons corresponding to the plurality of applications. The instructions may cause the processor to determine a shape of the third icon based on the multi-window layout, when generating the third icon.

According to an embodiment disclosed in the disclosure, the first user input may include drag and drop for dragging the first icon from the first area and dropping the first icon to the second area.

According to an embodiment disclosed in the disclosure, the instructions may cause the processor to identify a location where the first icon is dropped to the second area and may determine the multi-window layout based on the identified location.

According to an embodiment disclosed in the disclosure, the multi-window layout may include two splits, three splits, and four splits.

According to an embodiment disclosed in the disclosure, the multi-window layout may include a pop-up window.

According to an embodiment disclosed in the disclosure, the instructions may cause the processor to receive a third user input for selecting the third icon, configure the multi-window layout mapped to the third icon in response to the third user input, based on the display feature information, and display execution screens of the plurality of applications on the second area, depending on the configured multi-window layout.

According to an embodiment disclosed in the disclosure, the instructions may cause the processor to obtain pieces of application feature information of the plurality of applications mapped to the third icon, when configuring the multi-window layout, and configure the multi-window layout based on the pieces of application feature information of the plurality of applications. The pieces of application feature information may include whether an application is installed and whether the application supports a multi-window mode.

According to an embodiment disclosed in the disclosure, the instructions may cause the processor to change a form where the third icon is displayed on the first area based on the display feature information.

According to an embodiment disclosed in the disclosure, the instructions may cause the processor to disable an icon to which a multi-window layout incapable of being displayed in a state of the electronic device in the third icon based on the display feature information.

According to an embodiment disclosed in the disclosure, a control method of an electronic device (e.g., an electronic device 101 of FIG. 1, an electronic device 201 of FIG. 2, an electronic device 601 of FIG. 6, an electronic device 602 of FIG. 6, an electronic device 701 of FIG. 7, an electronic device 702 of FIG. 7, an electronic device 810 of FIGS. 8A to 8D, 9A to 9C, and 10, an electronic device 1301 of FIG. 13, an electronic device 1401 of FIGS. 14A and 14B, or an electronic device 1402 of FIGS. 14A and 14B) supporting a multi-window mode may include obtaining display feature information of a display (e.g., a display module 160 of FIG. 1, a display 220 of FIG. 2, a first display 610 of FIG. 6, a second display 620 of FIG. 6, a rollable display 630 of FIG. 6, a display 710 of FIG. 7, a display 720 of FIG. 7, a display 860 of FIGS. 8A to 8D, 9A to 9C, and 10, a display 1360 of FIG. 13, a second display 1420 of FIGS. 14A and 14B, a first display 1420 of FIGS. 14A and 14B, or a rollable display 1430 of FIGS. 14A and 14B) of the electronic device based on a state of the electronic device, which is identified by a sensor (e.g., a sensor module 176 of FIG. 1 or a sensor 210 of FIG. 2) of the electronic device, receiving a first input for selecting a first icon (e.g., a first icon 8810, 8812, 8814, 8816, or 8818) for running an application, which is displayed on a first area (e.g., a first area 881 of FIGS. 8A to 8D, 9A to 9C, and 10, a first area 1181 of FIG. 11, a first area 1381 of FIG. 13, a first area 1481 of FIGS. 14A and 14B, or a first area 1491 of FIGS. 14A and 14B) of a display area of the display, determining a multi-window layout displaying execution screens of a plurality of applications in response to the first user input, based on the display feature information, displaying the determined multi-window layout on a second area (e.g., a first area 882 of FIGS. 8A to 8D, 9A to 9C, and 10, a first area 1182 of FIG. 11, a first area 1382 of FIG. 13, a first area 1482 of FIGS. 14A and 14B, or a first area 1492 of FIGS. 14A and 14B) of the display area of the display, displaying a second icon (e.g., a second icon 8822 of FIGS. 9A to 9C, and 10) to which an operation of storing the displayed multi-window layout is mapped, and storing the displayed multi-window layout, in response to receiving a second user input for selecting the second icon, and generating and displaying a third icon (e.g., a third icon 8830, 8832, 8834, or 8836 of FIGS. 9A to 9C, and 10, a first N-pair icon 1182 of FIG. 11, a second N-pair icon 1183 of FIG. 11, a third icon 1383 of FIG. 13, or a third icon 1483, 1483', 1493, 1493', 1485, 1485', 1495, or 1495' of FIGS. 14A and 14B) to which the multi-window layout is mapped on the first area.

According to an embodiment disclosed in the disclosure, the third icon may include a plurality of first icons corresponding to the plurality of applications. The generating of the third icon may include determining a shape of the third icon based on the multi-window layout.

According to an embodiment disclosed in the disclosure, the first user input may include drag and drop for dragging the first icon from the first area and dropping the first icon to the second area.

According to an embodiment disclosed in the disclosure, the determining of the multi-window layout may include identifying a location where the first icon is dropped to the second area and determining the multi-window layout based on the identified location.

According to an embodiment disclosed in the disclosure, the multi-window layout may include two splits, three splits, and four splits.

According to an embodiment disclosed in the disclosure, the multi-window layout may include a pop-up window.

According to an embodiment disclosed in the disclosure, the method may further include receiving a third user input for selecting the third icon, configuring the multi-window layout mapped to the third icon in response to the third user input, based on the display feature information, and displaying execution screens of the plurality of applications on the second area, depending on the configured multi-window layout.

According to an embodiment disclosed in the disclosure, the configuring of the multi-window layout may include obtaining pieces of application feature information of the plurality of applications mapped to the third icon, and configuring the multi-window layout based on the application feature information of the plurality of applications. The pieces of application feature information may include whether an application is installed and whether the application supports a multi-window mode.

According to an embodiment disclosed in the disclosure, the method may further include changing a form where the third icon is displayed on the first area based on the display feature information.

According to an embodiment disclosed in the disclosure, the changing of the form where the third icon is displayed on the first area may include disabling an icon to which a multi-window layout incapable of being displayed in a state of the electronic device in the third icon based on the display feature information.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a sensor;
a display;
memory storing one or more computer programs; and
one or more processors connected to the sensor, the display, and the memory,
wherein the one or more computer programs include computer-executable instructions that, when executed by the one or more processors individually or collectively, cause the electronic device to:
obtain display feature information of the display based on a state of the electronic device, the state being identified by the sensor,
receive a first user input for selecting a first icon for running an application, the first icon being displayed on a first area of a display area of the display,
determine a multi-window layout displaying execution screens of a plurality of applications in response to the first user input, based on the display feature information,
display the determined multi-window layout on a second area of the display,
display a second icon across different windows of the multi-window layout in the second area to which an operation of storing the displayed multi-window layout is mapped, and
store the displayed multi-window layout, in response to receiving a second user input for selecting the second icon in the second area, and generate and display a third icon to which the multi-window layout is mapped on the first area,
wherein the third icon includes a plurality of the first icons corresponding to the plurality of applications, and
wherein the one or more computer programs further include computer-executable instructions that, when executed by the one or more processors individually or collectively, cause the electronic device to:
determine a shape of the third icon based on a location of each of a plurality of windows of the multi-window layout and an arrangement structure of the plurality of windows.

2. The electronic device of claim 1, wherein the first user input includes drag and drop for dragging the first icon from the first area and dropping the first icon to the second area.

3. The electronic device of claim 2, wherein the one or more computer programs further include computer-executable instructions that, when executed by the one or more processors individually or collectively, cause the electronic device to:
identify a location where the first icon is dropped to the second area, and
determine the multi-window layout based on the identified location.

4. The electronic device of claim 3, wherein the multi-window layout includes two splits, three splits, and four splits.

5. The electronic device of claim 3, wherein the multi-window layout includes a pop-up window.

6. The electronic device of claim 1, wherein the one or more computer programs further include computer-executable instructions that, when executed by the one or more processors individually or collectively, cause the electronic device to:
   receive a third user input for selecting the third icon,
   configure the multi-window layout mapped to the third icon in response to the third user input, based on the display feature information, and
   display execution screens of the plurality of applications on the second area, depending on the configured multi-window layout.

7. The electronic device of claim 6,
   wherein the one or more computer programs further include computer-executable instructions that, when executed by the one or more processors individually or collectively, cause the electronic device to:
   obtain pieces of application feature information of the plurality of applications mapped to the third icon, when configuring the multi-window layout, and
   configure the multi-window layout based on the pieces of application feature information of the plurality of applications, and
   wherein the pieces of application feature information include whether an application is installed and whether the application supports a multi-window mode.

8. The electronic device of claim 1, wherein the one or more computer programs further include computer-executable instructions that, when executed by the one or more processors individually or collectively, cause the electronic device to:
   change a form where the third icon is displayed on the first area based on the display feature information.

9. The electronic device of claim 8, wherein the one or more computer programs further include computer-executable instructions that, when executed by the one or more processors individually or collectively, cause the electronic device to:
   disable an icon to which a multi-window layout incapable of being displayed in a state of the electronic device in the third icon based on the display feature information.

10. The electronic device of claim 1, wherein the second icon in the second area sits on a split between windows of the multi-window layout.

11. A method performed by an electronic device for supporting a multi-window mode, the method comprising:
   obtaining, by the electronic device, display feature information of a display of the electronic device based on a state of the electronic device, the state being identified by a sensor of the electronic device;
   receiving, by the electronic device, a first user input for selecting a first icon for running an application, the first icon being displayed on a first area of a display area of the display;
   determining, by the electronic device, a multi-window layout displaying execution screens of a plurality of applications in response to the first user input, based on the display feature information;
   displaying, by the electronic device, the determined multi-window layout on a second area of the display area of the display;
   displaying, by the electronic device, a second icon across different windows of the multi-window layout in the second area to which an operation of storing the multi-window layout displayed on the second area is mapped; and
   storing, by the electronic device, the displayed multi-window layout, in response to receiving a second user input for selecting the second icon in the second area, and generating and displaying a third icon to which the multi-window layout is mapped on the first area,
   wherein the third icon includes a plurality of first icons corresponding to the plurality of applications, and
   wherein the generating of the third icon includes determining a shape of the third icon based on a location of each of a plurality of windows of the multi-window layout and an arrangement structure of the plurality of windows.

12. The method of claim 11,
   wherein the first user input includes drag and drop for dragging the first icon from the first area and dropping the first icon to the second area, and
   wherein the determining of the multi-window layout includes:
   identifying a location where the first icon is dropped to the second area, and
   determining the multi-window layout based on the identified location.

13. The method of claim 11, further comprising:
   receiving a third user input for selecting the third icon;
   configuring the multi-window layout mapped to the third icon in response to the third user input, based on the display feature information; and
   displaying execution screens of the plurality of applications on the second area, depending on the configured multi-window layout.

14. The method of claim 13,
   wherein the configuring of the multi-window layout includes:
   obtaining pieces of application feature information of the plurality of applications mapped to the third icon, and
   configuring the multi-window layout based on the pieces of application feature information of the plurality of applications, and
   wherein the pieces of application feature information include whether an application is installed and whether the application supports a multi-window mode.

15. The method of claim 12, wherein the multi-window layout includes two splits, three splits, and four splits.

16. The method of claim 12, wherein the multi-window layout includes a pop-up window.

17. The method of claim 11, further comprising:
   changing a form where the third icon is displayed on the first area based on the display feature information.

18. The method of claim 17, wherein the changing of the form where the third icon is displayed on the first area includes:
   disabling an icon to which a multi-window layout incapable of being displayed in a state of the electronic device in the third icon based on the display feature information.

19. One or more non-transitory computer-readable storage media storing one or more computer programs including computer-executable instructions that, when executed by one or more processors of an electronic device individually or collectively, cause the electronic device to perform operations, the operations comprising:
   obtaining, by the electronic device, display feature information of a display of the electronic device based on a state of the electronic device, the state being identified by a sensor of the electronic device;

receiving, by the electronic device, a first user input for selecting a first icon for running an application, the first icon being displayed on a first area of a display area of the display;

determining, by the electronic device, a multi-window layout displaying execution screens of a plurality of applications in response to the first user input, based on the display feature information;

displaying, by the electronic device, the determined multi-window layout on a second area of the display area of the display;

displaying, by the electronic device, a second icon across different windows of the multi-window layout in the second area to which an operation of storing the multi-window layout displayed on the second area is mapped; and storing, by the electronic device, the displayed multi-window layout, in response to receiving a second user input for selecting the second icon in the second area, and generating and displaying a third icon to which the multi-window layout is mapped on the first area wherein the third icon includes a plurality of first icons corresponding to the plurality of applications, and wherein the generating of the third icon includes determining a shape of the third icon based on a location of each of a plurality of windows of the multi-window layout and an arrangement structure of the plurality of windows.

* * * * *